(12) United States Patent
Hsieh et al.

(10) Patent No.: US 12,541,790 B2
(45) Date of Patent: *Feb. 3, 2026

(54) DIGITAL MORTGAGE APPLICATION SYSTEM AND PROCESSES THEREOF

(71) Applicant: loanDepot.com, LLC, Foothill Ranch, CA (US)

(72) Inventors: Anthony Li Hsieh, Foothill Ranch, CA (US); Dominick Edillo Marchetti, Dove Canyon, CA (US); Tim Andrew Von Kaenel, Coto de Caza, CA (US)

(73) Assignee: loanDepot.com, LLC, Foothill Ranch (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/692,580

(22) Filed: Mar. 11, 2022

(65) Prior Publication Data

US 2022/0198558 A1 Jun. 23, 2022

Related U.S. Application Data

(63) Continuation of application No. 16/243,560, filed on Jan. 9, 2019, now Pat. No. 11,276,114.
(Continued)

(51) Int. Cl.
*G06Q 40/00* (2023.01)
*G06F 3/0483* (2013.01)
(Continued)

(52) U.S. Cl.
CPC .......... *G06Q 40/03* (2023.01); *G06F 3/0483* (2013.01); *G06Q 20/3223* (2013.01); *H04L 51/046* (2013.01)

(58) Field of Classification Search
USPC .............. 705/35, 39, 38, 37, 40, 26, 1.1, 64; 715/29, 205; 235/492, 462.46, 380, 379;
(Continued)

(56) References Cited

U.S. PATENT DOCUMENTS 7,374,079 B2 * 5/2008 Nam ...................... G06Q 20/04
235/492
8,881,250 B2 11/2014 Yefimov et al.
(Continued)

OTHER PUBLICATIONS

Framework Architecture of e-Loan Negotiation System; 2008 3rd International Conference on Information and Communication Technologies: From Theory to Applications (pp. 1-6); I. Serguievskaia, H. Al-Sakran; Apr. 7, 2008 . . . (Year: 2008).*
(Continued)

*Primary Examiner* — Tien C Nguyen
(74) *Attorney, Agent, or Firm* — Rutan & Tucker LLP; Hani Z. Sayed

(57) ABSTRACT

Disclosed is a digital mortgage application system including, in some embodiments, a first web application, a second web application, and a digital mortgage application stack including a web server, a digital mortgage application server, and a database server. The first web application is configured to present a borrower graphical user interface ("GUI") within a web browser on a first client host. The borrower GUI includes a digital mortgage application divided into a number of borrower-fillable sections configured to hold borrower-related information. Some of the sections are configured for optionally automatically filling in one or more portions of the borrower-related information. The second web application is configured to present a lender GUI within a web browser on a second client host. The lender GUI is configured to allow a representative of the lender to review borrower information in one or more digital mortgage applications of one or more borrowers.

16 Claims, 15 Drawing Sheets

Related U.S. Application Data

Figure 1:
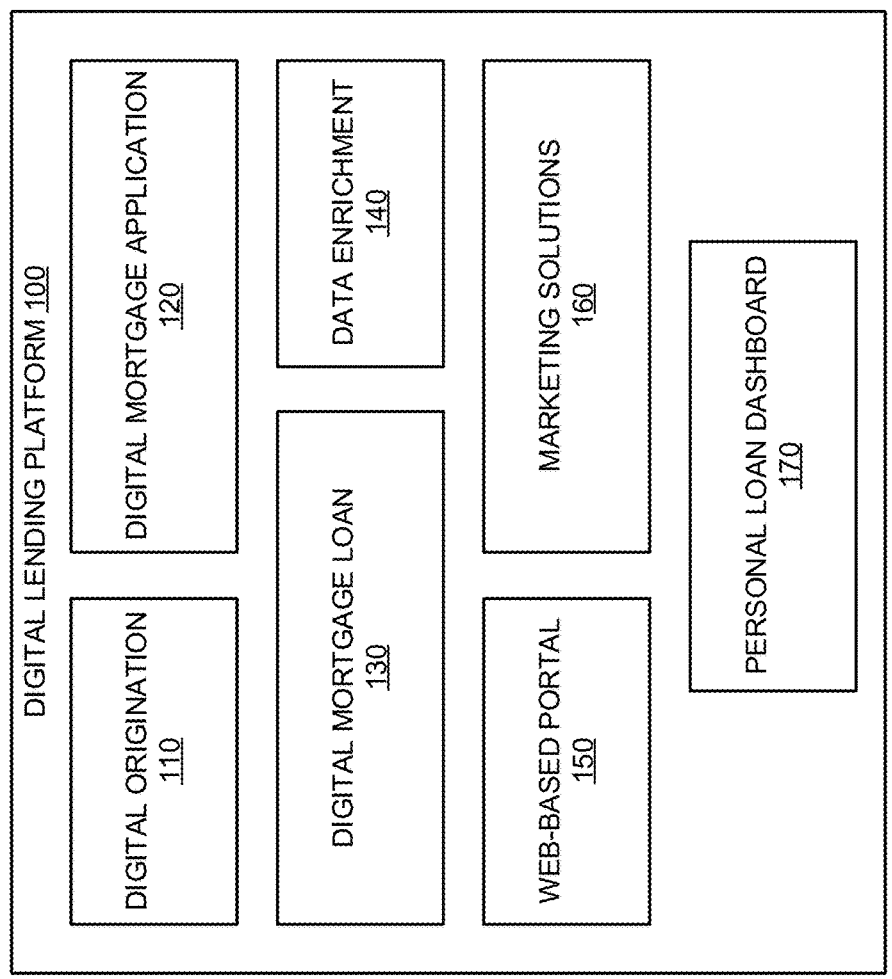

(60) Provisional application No. 62/616,022, filed on Jan. 11, 2018.

(51) Int. Cl.
 *G06Q 20/32* (2012.01)
 *G06Q 40/03* (2023.01)
 *H04L 51/046* (2022.01)

(58) Field of Classification Search
 USPC .................................................. 340/5.74
 See application file for complete search history.

(56) References Cited

U.S. PATENT DOCUMENTS

| | | | | |
|---|---|---|---|---|
| 8,972,297 | B2* | 3/2015 | Kay | G07F 19/211 |
| | | | | 705/1.1 |
| 9,113,333 | B2 | 8/2015 | Lo et al. | |
| 2002/0060246 | A1* | 5/2002 | Gobburu | G06Q 30/02 |
| | | | | 235/462.46 |
| 2002/0109580 | A1* | 8/2002 | Shreve | G07C 9/00309 |
| | | | | 340/5.74 |
| 2003/0010831 | A1* | 1/2003 | Ye | G07F 7/0866 |
| | | | | 235/492 |
| 2003/0018558 | A1* | 1/2003 | Heffner | G06Q 40/02 |
| | | | | 705/37 |
| 2004/0019564 | A1* | 1/2004 | Goldthwaite | G06Q 20/425 |
| | | | | 705/44 |
| 2004/0044620 | A1* | 3/2004 | Iversen | G06Q 30/06 |
| | | | | 705/40 |
| 2004/0098350 | A1* | 5/2004 | Labrou | G06Q 20/12 |
| | | | | 705/64 |
| 2004/0128228 | A1* | 7/2004 | Whipple | G06Q 40/02 |
| | | | | 705/38 |
| 2004/0215553 | A1* | 10/2004 | Gang | G06Q 40/00 |
| | | | | 705/38 |
| 2013/0117647 | A1* | 5/2013 | Weiss | G06Q 10/10 |
| | | | | 715/205 |
| 2014/0032392 | A1* | 1/2014 | Ansari | G06Q 40/02 |
| | | | | 705/38 |
| 2016/0071206 | A1* | 3/2016 | Danieli | G06Q 40/03 |
| | | | | 705/38 |
| 2016/0171600 | A1* | 6/2016 | Kay | G06F 16/2455 |
| | | | | 705/38 |

OTHER PUBLICATIONS

Research on the application of data mining technology in user management of P2P network financial platform; 2016 International Conference on Logistics, Informatics and Service Sciences (LISS) (pp. 1-5); Yutong Jiang, Jiayi Yao, Jiangfeng Xu, Jul. 24, 2016. (Year: 2016).*

Technology in the mortgage industry: the Fannie Mae experience; IT Professional (vol. 4, Issue: 3, pp. 27-32); B. Kelvie M. Kraft; May 1, 2002. (Year: 2002).*

An Intelligent System for Business Loan Processing; 2012 Third International Conference on Intelligent Systems Modelling and Simulation (pp. 390-396); Lee, V., Nan Wang; Feb. 1, 2012. (Year: 2012).*

* cited by examiner

DIGITAL MORTGAGE APPLICATION SYSTEM AND PROCESSES THEREOF

PRIORITY

This application claims the benefit of priority to U.S. patent application Ser. No. 16/243,560 filed on Jan. 9, 2019 and U.S. Provisional Patent Application No. 62/616,022, filed Jan. 11, 2018, titled "DIGITAL MORTGAGE APPLICATION SYSTEM AND PROCESSES THEREOF," which is incorporated by reference in its entirety into this application.

BACKGROUND

An important financial service provided by financial institutions is lending, which can include originating loans, servicing loans, or both originating and serving loans. There are many different types of loans available through such financial institutions. Broadly, the different types of loans are divided between secured loans and unsecured loans, wherein the secured loans are secured against borrowers' assets. Secured loans include, for example, mortgages, home equity loans, home equity lines of credit, or automotive loans. Unsecured loans include, for example, personal loans, personal lines of credit, student loans, or credit cards.

Lending, particularly originating loans such as mortgages, requires many fragmented, often manual processes of both borrowers and lenders. For a borrower, such processes include filling out a loan application and providing information in support of the loan application, the supporting information including, for example, employment, income, asset, and liability information. For a lender, such processes include processing the borrower's loan application and verifying the supporting information, underwriting a potential loan and performing a detailed risk assessment in view of the supporting information, and, ultimately, upon approval from underwriting, funding the loan. Moreover, such processes are highly specific to loan type. This obviates any financial benefit from economies of scale that could otherwise be passed onto borrowers and lenders alike if such processes were more tightly integrated and generalized across the loan types. Accordingly, there is a need for a more highly automated, more tightly integrated lending platform that dissolves lines between lending for secured and unsecured loan types. Provided herein is a digital mortgage application system and processes thereof in support of the lending platform.

SUMMARY

Provided herein is a digital mortgage application system including, in some embodiments, a first web application configured to run at least in part from a primary memory of a first client host, a second web application configured to run at least in part from a primary memory of a second client host, and a digital mortgage application stack configured to run at least in part from a primary memory of at least one server host. The first web application is configured to present a borrower graphical user interface ("GUI") within a web browser on a display of the first client host. The borrower GUI includes a digital mortgage application divided into a number of borrower-fillable sections configured to hold borrower-related information. Some of the sections are configured for optionally automatically filling in one or more portions of the borrower-related information. The second web application is configured to present a lender GUI within a web browser on a display of the second client host. The lender GUI is configured to allow a representative of the lender to review borrower information in one or more digital mortgage applications of one or more borrowers. The digital mortgage application stack includes a web server, a digital mortgage application server, and a database server.

In some embodiments, the number of sections configured to hold borrower-related information include a borrower profile section, a subject property section, an employment history section, an income-and-asset information section, or a combination thereof. The sections are configured to hold the borrower-related information until transferred to the database server and stored in a database on a storage device of the at least one server host.

In some embodiments, each section of the number of sections configured for optionally automatically filling in the one or more portions of the borrower-related information includes one or more user-operable graphical elements configured to commence a section-specific information-filling process automated by the servers of the digital mortgage application stack upon activation of the graphical element.

In some embodiments, a borrower profile section of the number of sections is configured with a first graphical button configured to take a digital photograph of an item of borrower identification upon activation of the first graphical button. The borrower profile section is optionally configured with a second graphical button. Either the first graphical button or the second graphical button is configured to send a borrower-approved digital photograph to the digital mortgage application stack upon the activation of the first graphical button or the second graphical button, if present, for the automated information-filling process.

In some embodiments, the digital mortgage application server includes an optical character recognition ("OCR") module. The OCR module is configured to recognize text in borrowers' digital photograph files or other image-based files, extract the text from the digital photograph files or the other image-based files, and provide the text by way of the web server for automated information-filling processes.

In some embodiments, a subject property section of the number of sections is configured with a graphical button configured to send a unique identifier for a real estate property to the digital mortgage application stack upon activation of the graphical button. The digital mortgage application stack is configured to fetch listing information for the real estate property from one or more multiple listings service databases for the automated information-filling process.

In some embodiments, an employment history section of the number of sections is configured with a graphical button configured to send one or more borrower identifiers to the digital mortgage application stack upon activation of the graphical button. The digital mortgage application stack is configured to fetch employment history information for the borrower from one or more employers, one or more third-party employment verification providers, or a combination thereof for the automated information-filling process.

In some embodiments, an income-and-asset information section of the number of sections is configured with a first graphical button configured to send one or more financial account identifiers to the digital mortgage application stack upon activation of the first graphical button. The income-and-asset information section is also configured with a second graphical button configured to send financial account authorization information to the digital mortgage application stack upon activation of the second graphical button. Upon receipt of both the one or more financial account identifiers and the financial account authorization information, the digital mortgage application stack is configured to link one or more financial accounts upon approval for the automated information-filling process.

In some embodiments, the digital mortgage application server includes an automated underwriting module. The automated underwriting module is configured to perform detailed risk assessments in view of the borrower-related information for automatically underwriting one or more potential loans per borrower for at least discussion with the representative of the lender.

In some embodiments, the digital mortgage application stack further includes an e-mail server. The lender GUI is further configured to allow the representative of the lender to send secured e-mail messages through the lender GUI by way of the e-mail server. The secured e-mail messages include automatic e-mail headers and attachments determined in accordance with a focus in the lender GUI on a particular borrower and loan process step.

Also provided herein is a digital mortgage application system including, in some embodiments, a mobile web application configured to run at least in part from a primary memory of a mobile device, a second web application configured to run at least in part from a primary memory of a personal computer, and a digital mortgage application stack configured to run at least in part from a primary memory of at least one server host. The mobile web application is configured to present a borrower GUI within a mobile web browser on a touchscreen of the mobile device. The borrower GUI includes a digital mortgage application divided into a number of borrower-fillable sections selected from a borrower profile section, a subject property section, an employment history section, and an income-and-asset information section, each of which sections is configured to hold borrower-related information. Some of the sections are configured with one or more user-operable graphical elements configured to commence one or more automated information-filling processes. The second web application is configured to present a lender GUI within a web browser on a display of the personal computer. The lender GUI is configured to allow a representative of the lender to review borrower information in one or more digital mortgage applications of one or more borrowers. The lender GUI is also configured to send secured e-mail messages with automatic e-mail headers and attachments determined in accordance with a focus in the lender GUI on a particular borrower and loan process step. The digital mortgage application stack includes a web server, a digital mortgage application server, a database server, and an e-mail server. At least the web server, the digital mortgage application server, and the database servers are configured to execute the one or more automated information-filling processes upon activation of the one or more graphical elements in the borrower GUI.

In some embodiments, the digital mortgage application server includes an OCR module. The OCR module is configured to recognize text in borrowers' digital photograph files or other image-based files, extract the text from the digital photograph files or the other image-based files, and provide the text by way of the web server for automated information-filling processes.

In some embodiments, the digital mortgage application server includes an automated underwriting module. The automated underwriting module is configured to perform detailed risk assessments in view of the borrower-related information for automatically underwriting one or more potential loans per borrower for at least discussion with the representative of the lender.

Also provided herein is a non-transitory computer-readable medium ("CRM") including executable instructions that, when executed on a server host by one or more processors, cause the server host to instantiate at least a portion of a digital mortgage application system configured to perform a number of steps including, in some embodiments, running a digital mortgage application stack at least in part from a primary memory of the server host, servicing at least a first request for a mobile web application from a first client host, and servicing at least a second request for a web application from a second client host. Running the digital mortgage application stack includes running a web server, a digital mortgage application server, and a database server configured to service requests from one or more client hosts. Servicing at least the first request for the mobile web application from the first client host includes providing the mobile web application such that the mobile web application runs at least in part from a primary memory of a mobile device configured as the first client host. The mobile web application is configured to present a borrower GUI within a mobile web browser on a touchscreen of the mobile device. The borrower GUI includes a digital mortgage application divided into a number of borrower-fillable sections configured to hold borrower-related information, some of which sections are configured for optionally automatically filling in one or more portions of the borrower-related information. Servicing at least the second request for the web application from the second client host includes providing the web application such that the web application runs at least in part from a primary memory of a personal computer configured as the second client host. The web application is configured to present a lender GUI within a web browser on a display of the personal computer. The lender GUI is configured to allow a representative of the lender to review information in one or more digital mortgage applications of one or more borrowers.

In some embodiments, the number of steps further include receiving by the database server the borrower-related information from the first client host and storing the borrower-related information in a database on a storage device of the server host. The number of sections configured to the hold borrower-related information until sent to the database server include a borrower profile section, a subject property section, an employment history section, an income-and-asset information section, or a combination thereof.

In some embodiments, the number of steps further include commencing a section-specific information-filling process of the one or more portions of the borrower-related information. The information-filling process is automated by the servers of the digital mortgage application stack upon activation of one or more user-operable graphical elements in each section of the number of sections of the borrower-related information.

In some embodiments, the number of steps further include receiving by the digital mortgage application stack a digital photograph file from the first client host. The digital photograph file is received by the digital mortgage application stack subsequent to activation of at least a first graphical button in a borrower profile section of the number of sections configured to take a digital photograph of an item of borrower identification. Either the first graphical button or an optional second graphical button in the borrower profile section is configured to send the digital photograph file to the digital mortgage application stack for the automated information-filling process.

In some embodiments, the number of steps further include recognizing text and extracting the text from the digital photograph file with an OCR module of the digital mortgage application server. In addition, the number of steps further includes sending the text by way of the web server to the first client host for the automated information-filling processes.

In some embodiments, the number of steps further include fetching listing information for a real estate property from one or more multiple listings service databases and sending the listing information by way of the web server to the first client host for the automated information-filling process. Fetching and sending the listing information is upon receipt of a unique identifier for the real estate property from the first client host subsequent to activation of a graphical button in a subject property section of the number of sections. The graphical button in the subject property section is configured to send the unique identifier for the real estate property to the digital mortgage application stack for the automated information-filling process.

In some embodiments, the number of steps further include fetching employment history information for the borrower and sending the employment history information by way of the web server to the first client host for the automated information-filling process. Fetching the employment history information includes fetching the employment history information from one or more employers, one or more third-party employment verification providers, or a combination thereof. Fetching and sending the employment history information is upon receipt of one or more borrower identifiers from the first client host subsequent to activation of a graphical button in an employment history section of the number of sections. The graphical button in the employment history section is configured to send one or more borrower identifiers to the digital mortgage application stack for the automated information-filling process.

In some embodiments, the number of steps further include receiving one or more financial account identifiers from the first client host, receiving financial account authorization information from the first client host, and linking one or more financial accounts for the automated information-filling process. Receiving the one or more financial account identifiers is upon activation of a first graphical button in an income-and-asset information section of the number of sections configured to send the one or more financial account identifiers to the digital mortgage application stack for the automated information-filling process. Receiving the financial account authorization is upon activation of a second graphical button in the income-and-asset information section configured to send the financial account authorization information to the digital mortgage application stack for the automated information-filling process.

In some embodiments, the number of steps further include performing a detailed risk assessment with an automated underwriting module of the digital mortgage application server in view of the borrower-related information for at least discussion of one or more potential loans per borrower with the representative of the lender.

In some embodiments, the number of steps further include sending one or more secured e-mail messages by way of an e-mail server of the digital mortgage application stack upon request by the representative of the lender through the lender GUI. E-mail headers and attachments are automatically determined in accordance with a focus in the lender GUI on a particular borrower and loan process step.

DRAWINGS

FIG. 1 provides a schematic illustrating a digital lending platform in accordance with some embodiments.

Figure 2A:
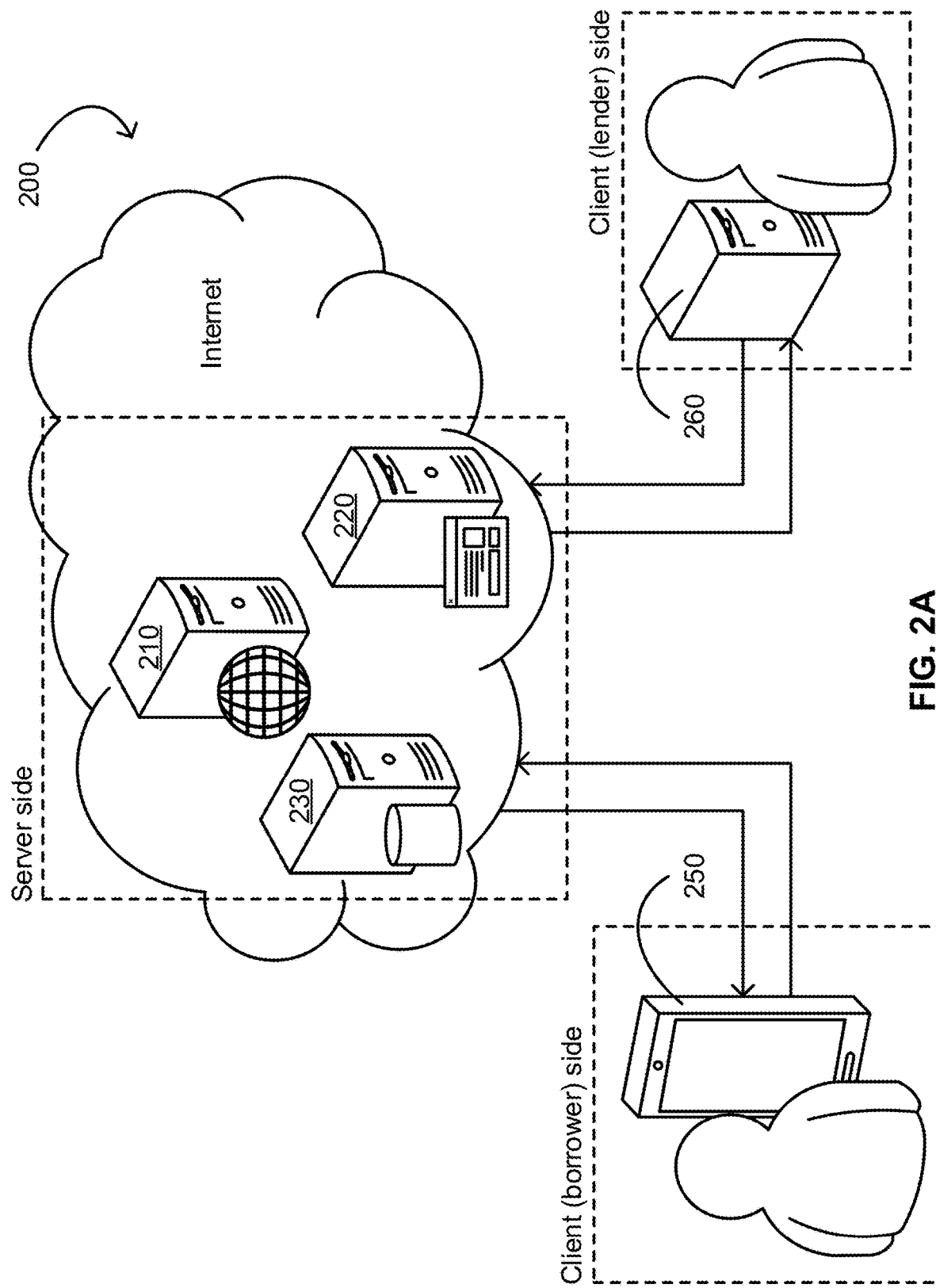

FIG. 2A provides a schematic illustrating a network of client and server hosts supporting a digital mortgage application system in accordance with some embodiments.

Figure 2B:
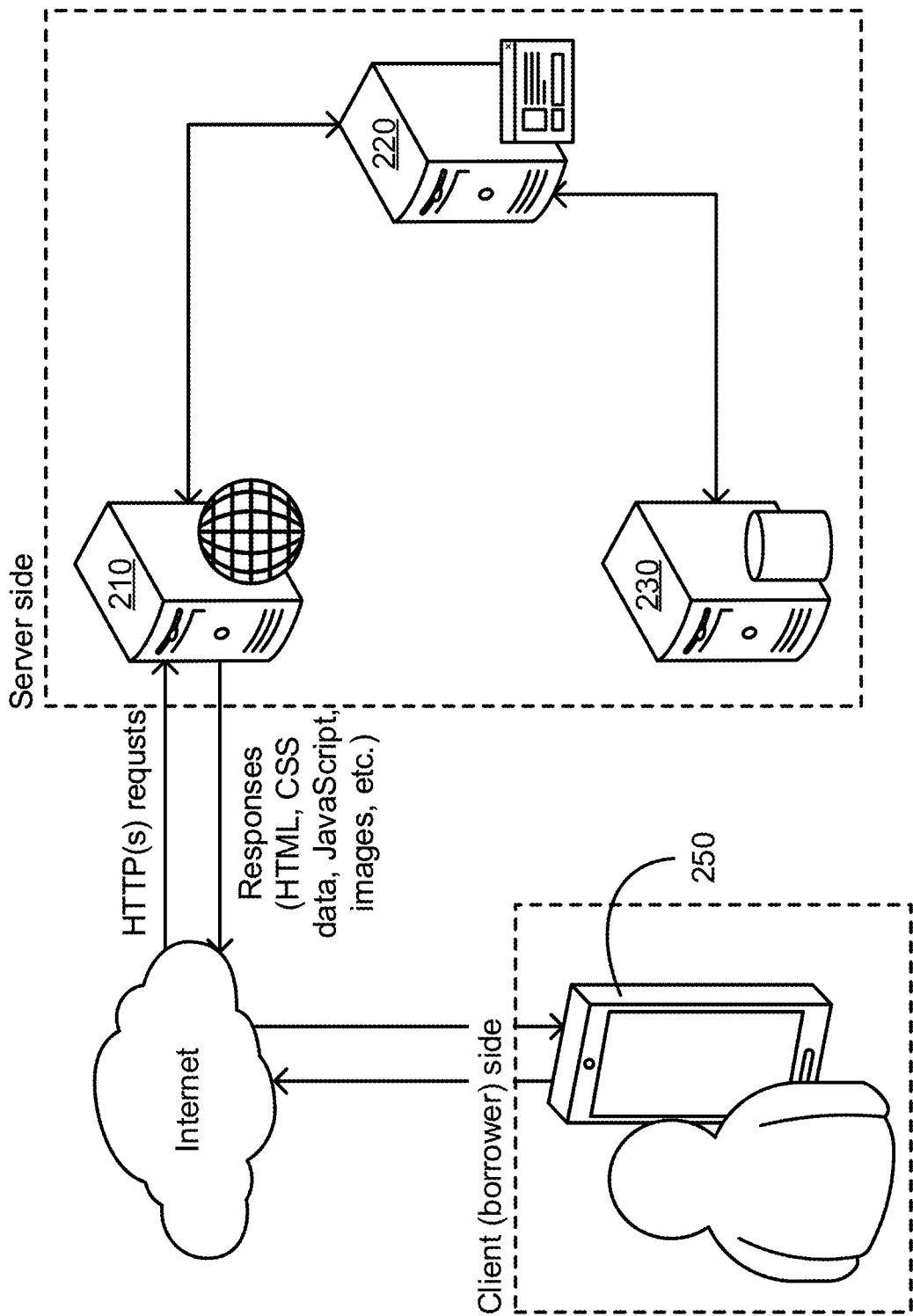

FIG. 2B provides a schematic illustrating a borrower's client host and one or more server hosts supporting a digital mortgage application system in accordance with some embodiments.

Figure 2C:
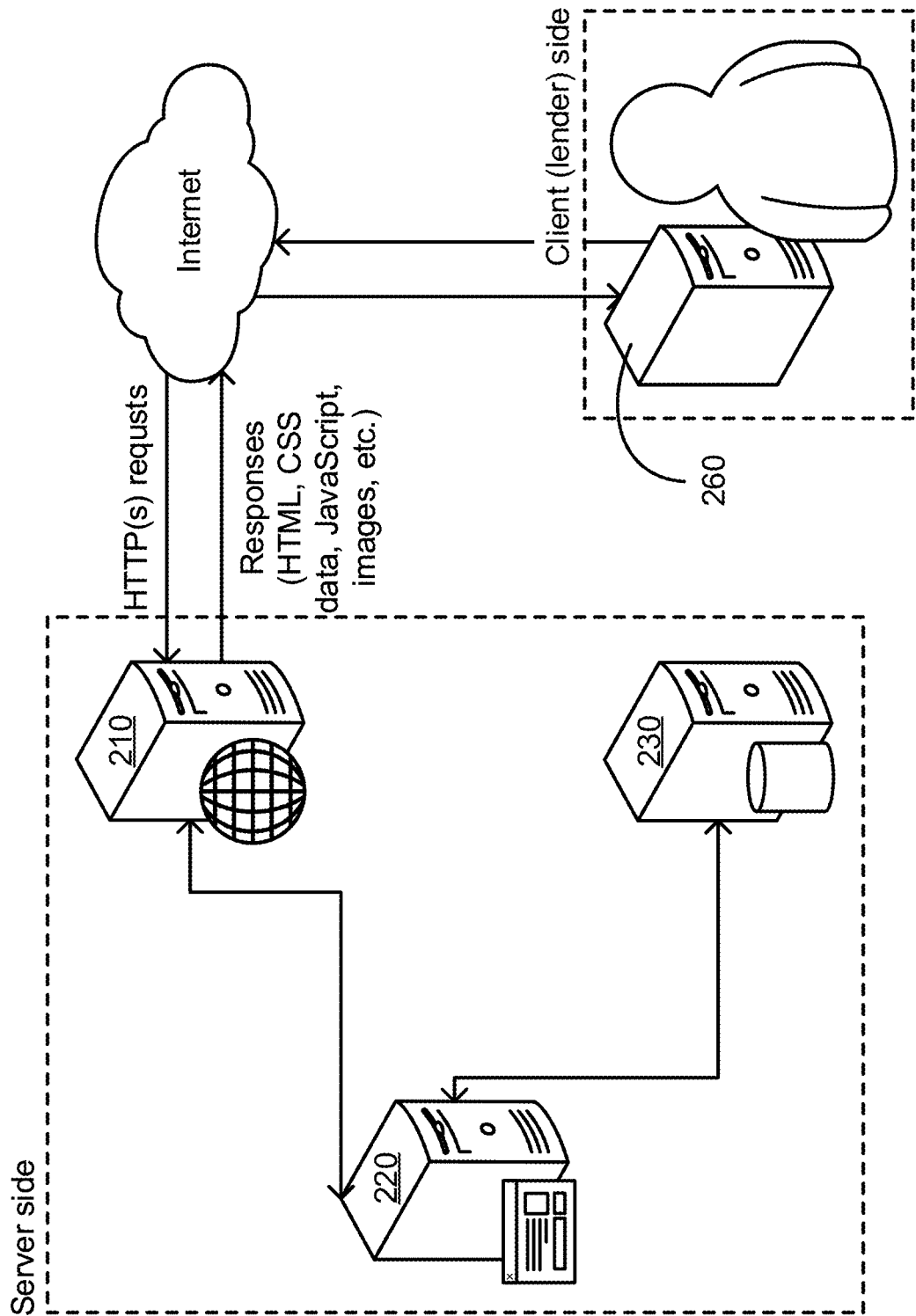

FIG. 2C provides a schematic illustrating a lender's client host and one or more server hosts supporting a digital mortgage application system in accordance with some embodiments.

Figure 3:
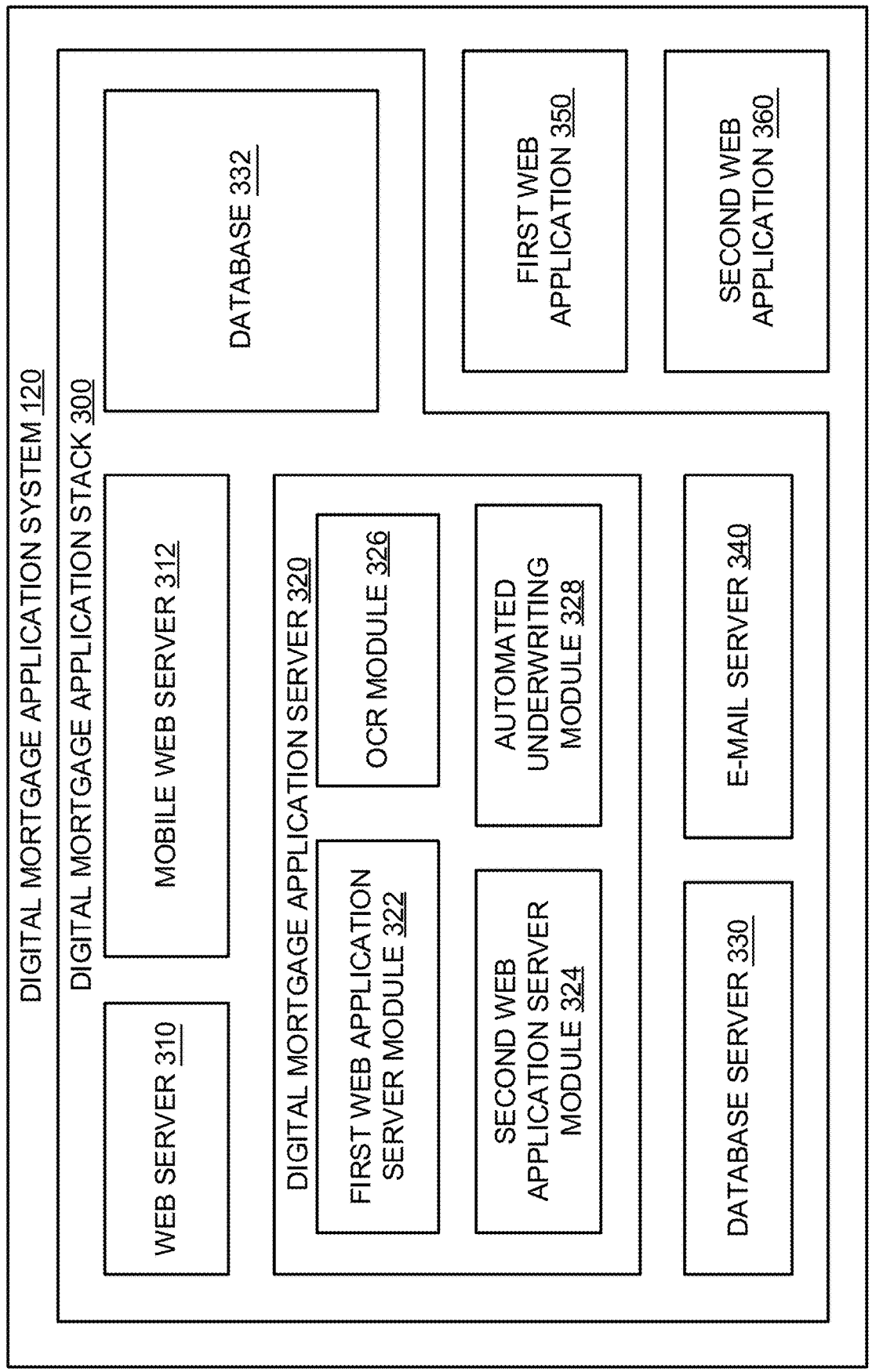

FIG. 3 provides a schematic illustrating a digital mortgage application system in accordance with some embodiments.

Figure 4B:
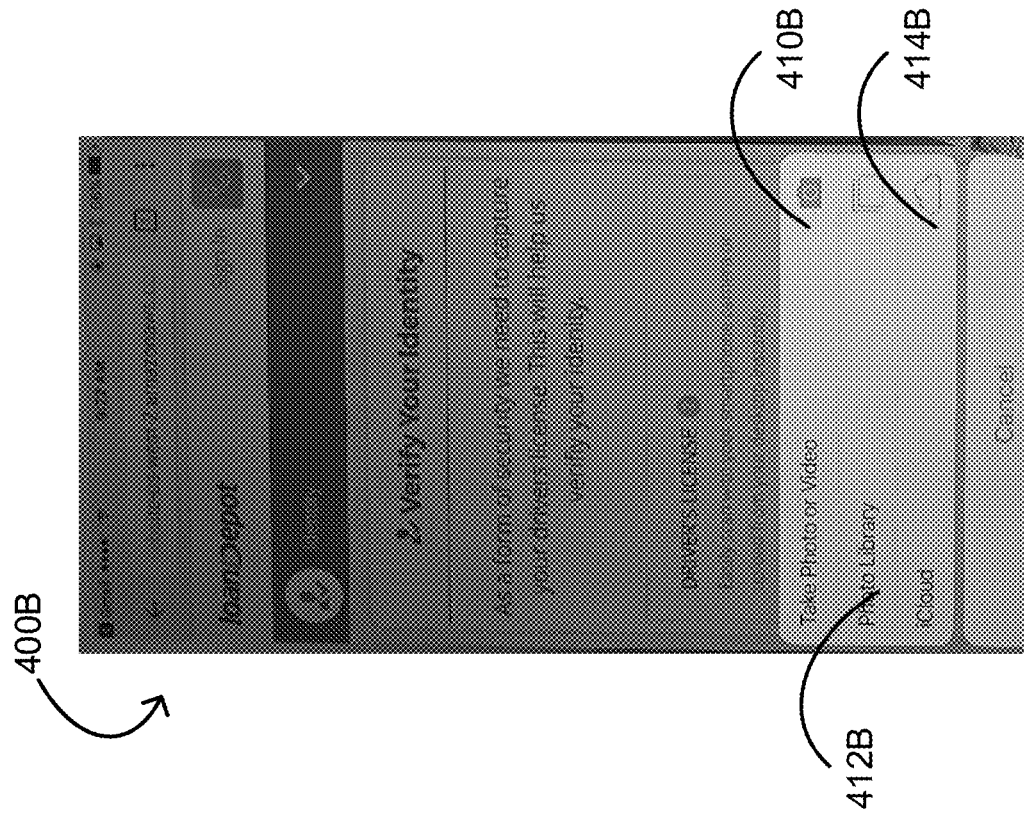
Figure 4A:
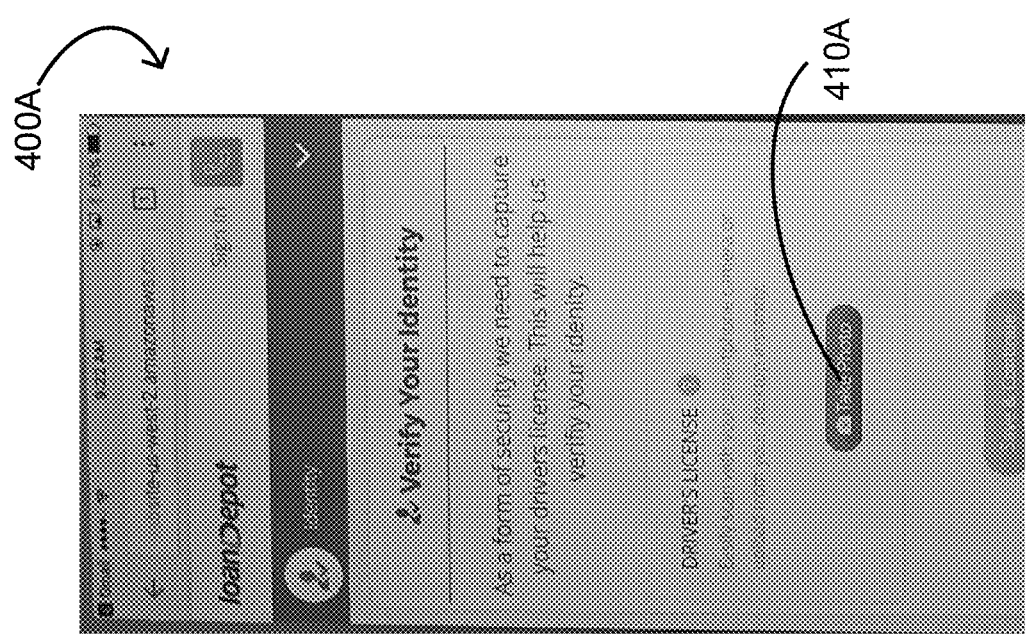

FIG. 4A provides an image of a first screen in a borrower GUI of a web application in accordance with some embodiments.

FIG. 4B provides an image of a second screen in a borrower GUI of a web application in accordance with some embodiments.

Figure 4D:
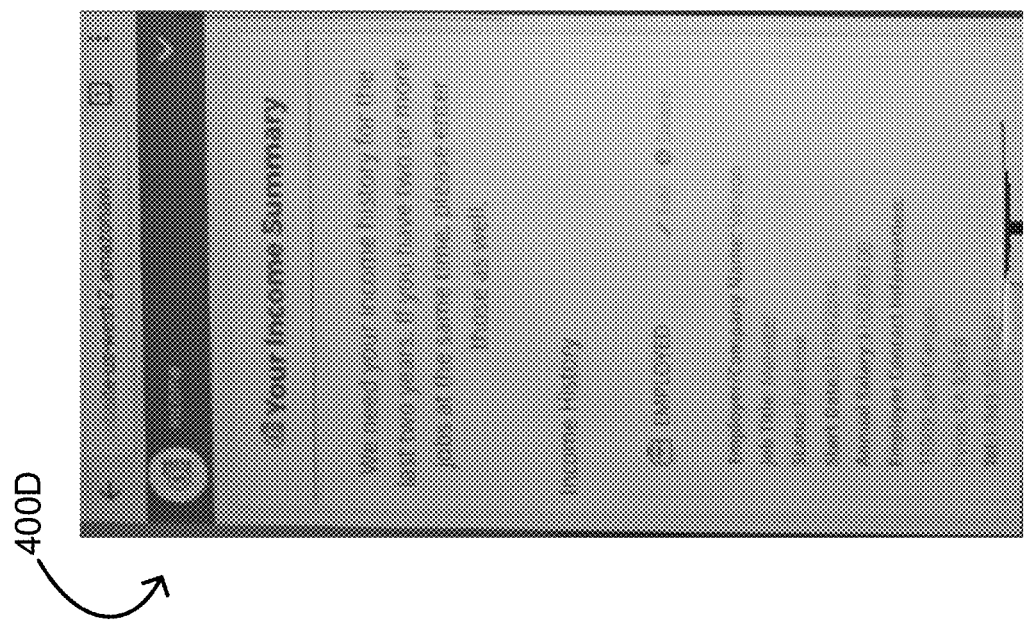
Figure 4C:
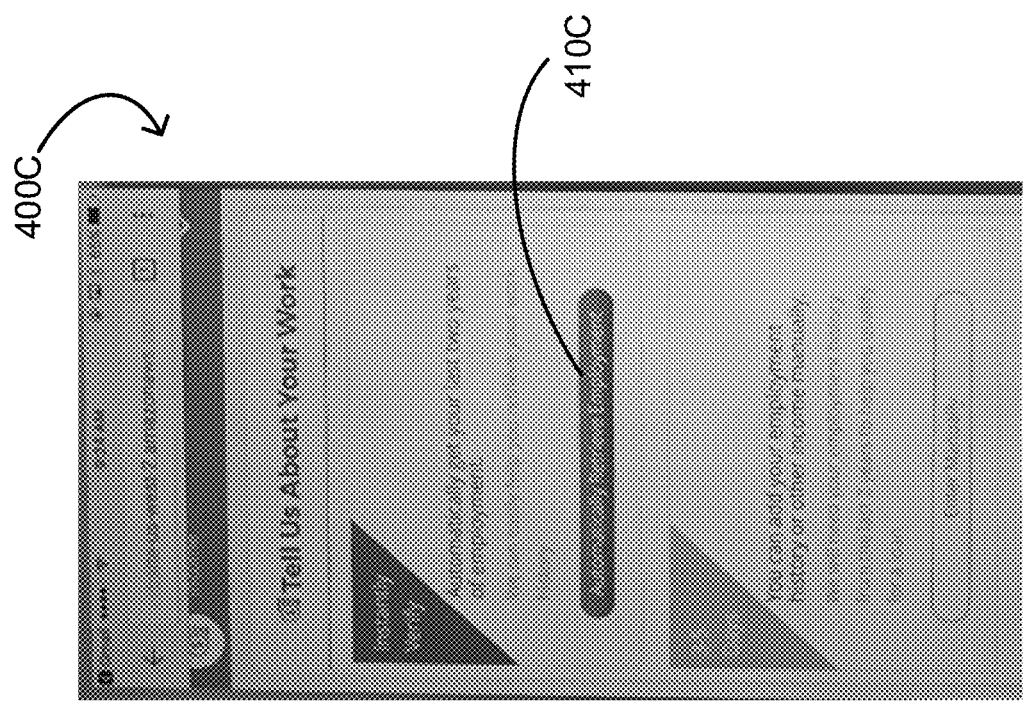

FIG. 4C provides an image of a third screen in a borrower GUI of a web application in accordance with some embodiments.

FIG. 4D provides an image of a fourth screen in a borrower GUI of a web application in accordance with some embodiments.

Figures 4E, 4F:
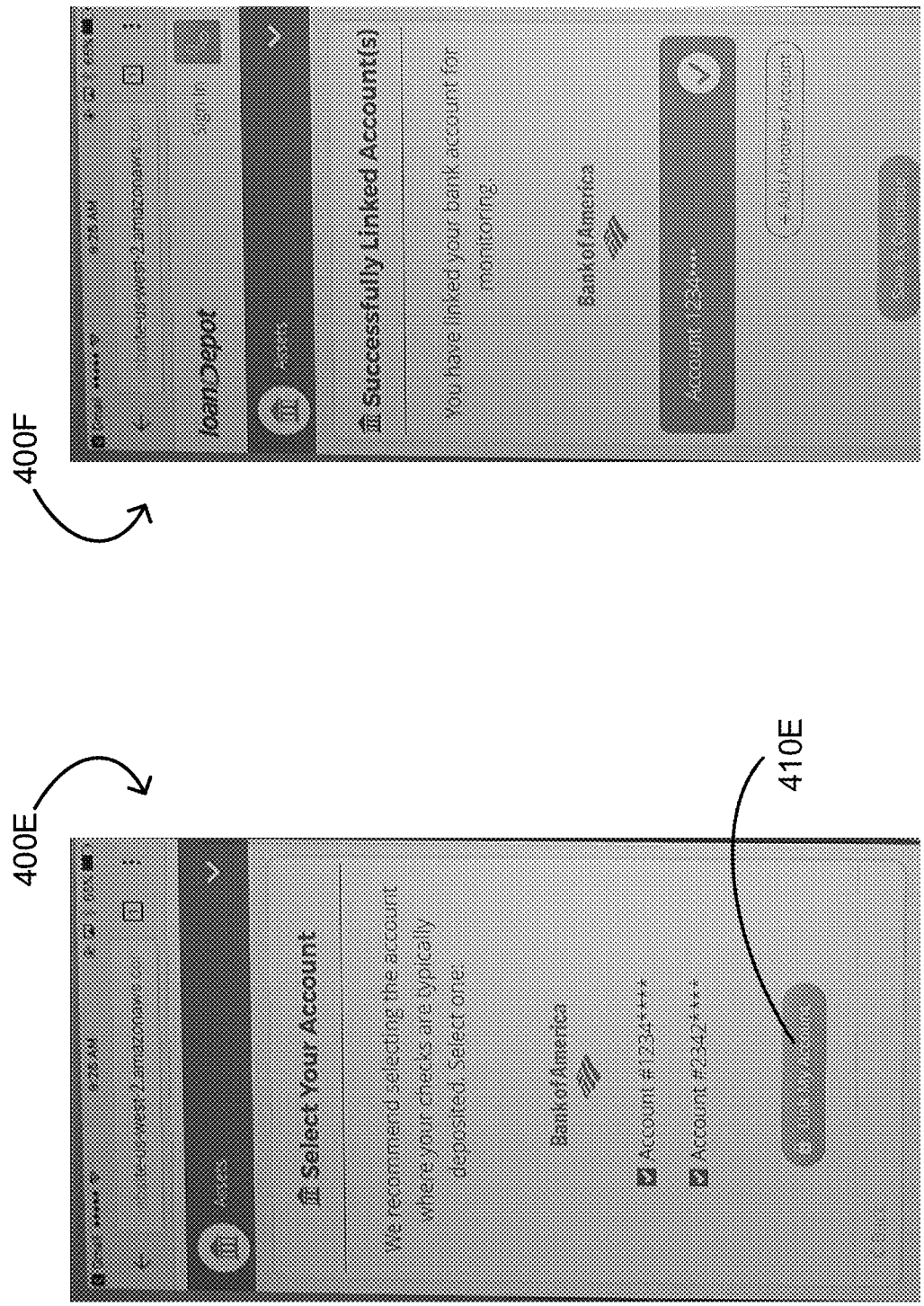

FIG. 4E provides an image of a fifth screen in a borrower GUI of a web application in accordance with some embodiments.

FIG. 4F provides an image of a sixth screen in a borrower GUI of a web application in accordance with some embodiments.

Figure 4H:
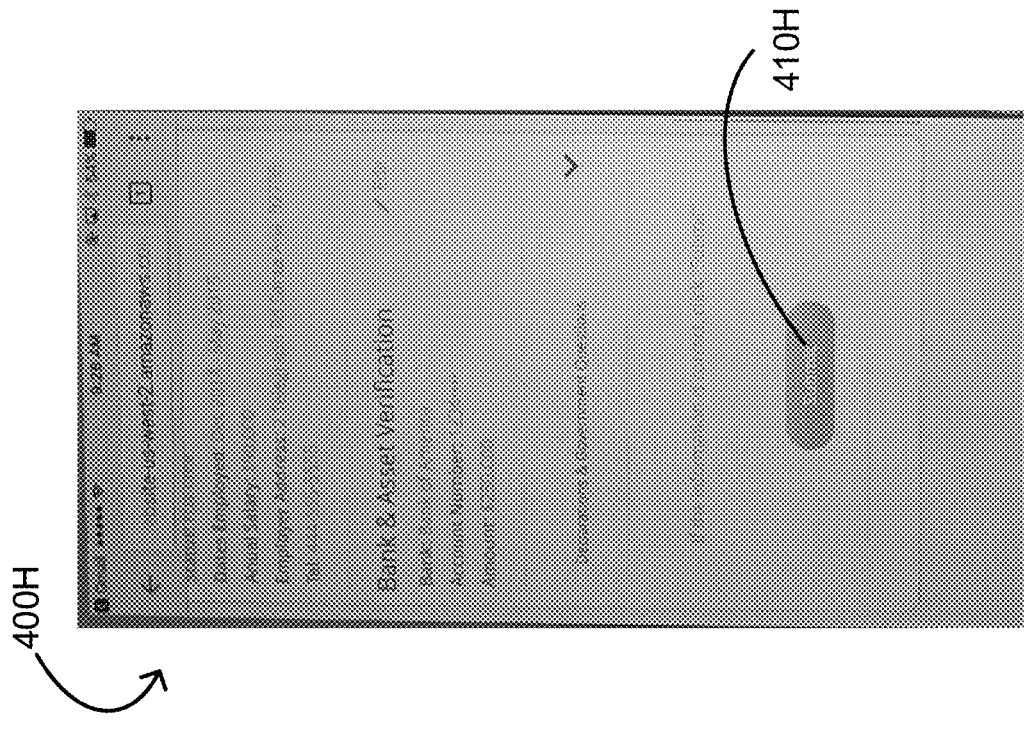
Figure 4G:
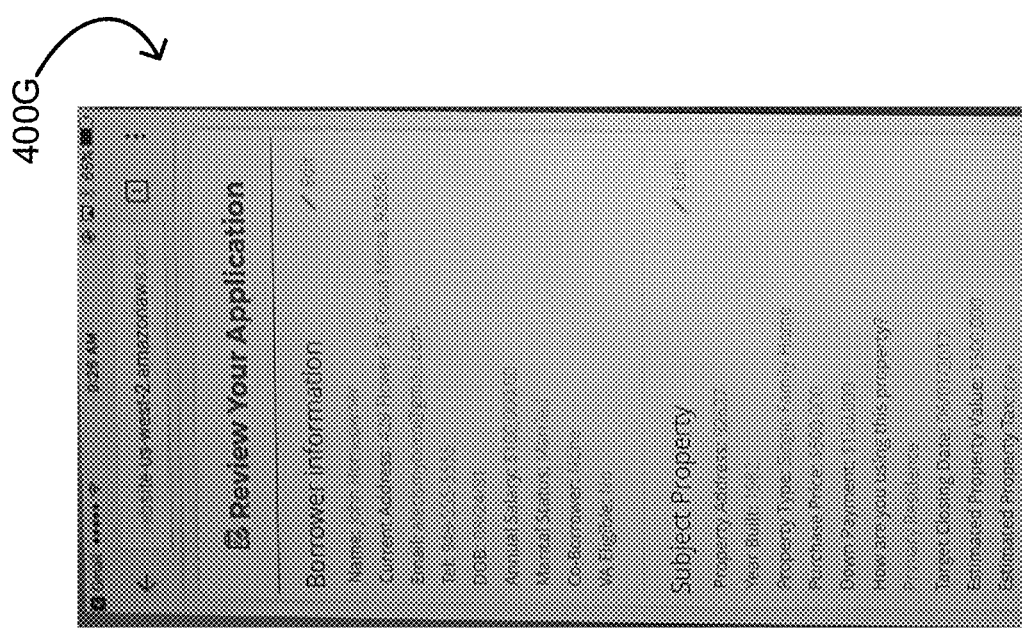

FIG. 4G provides an image of a seventh screen in a borrower GUI of a web application in accordance with some embodiments.

FIG. 4H provides an image of an eighth screen in a borrower GUI of a web application in accordance with some embodiments.

Figure 5A:
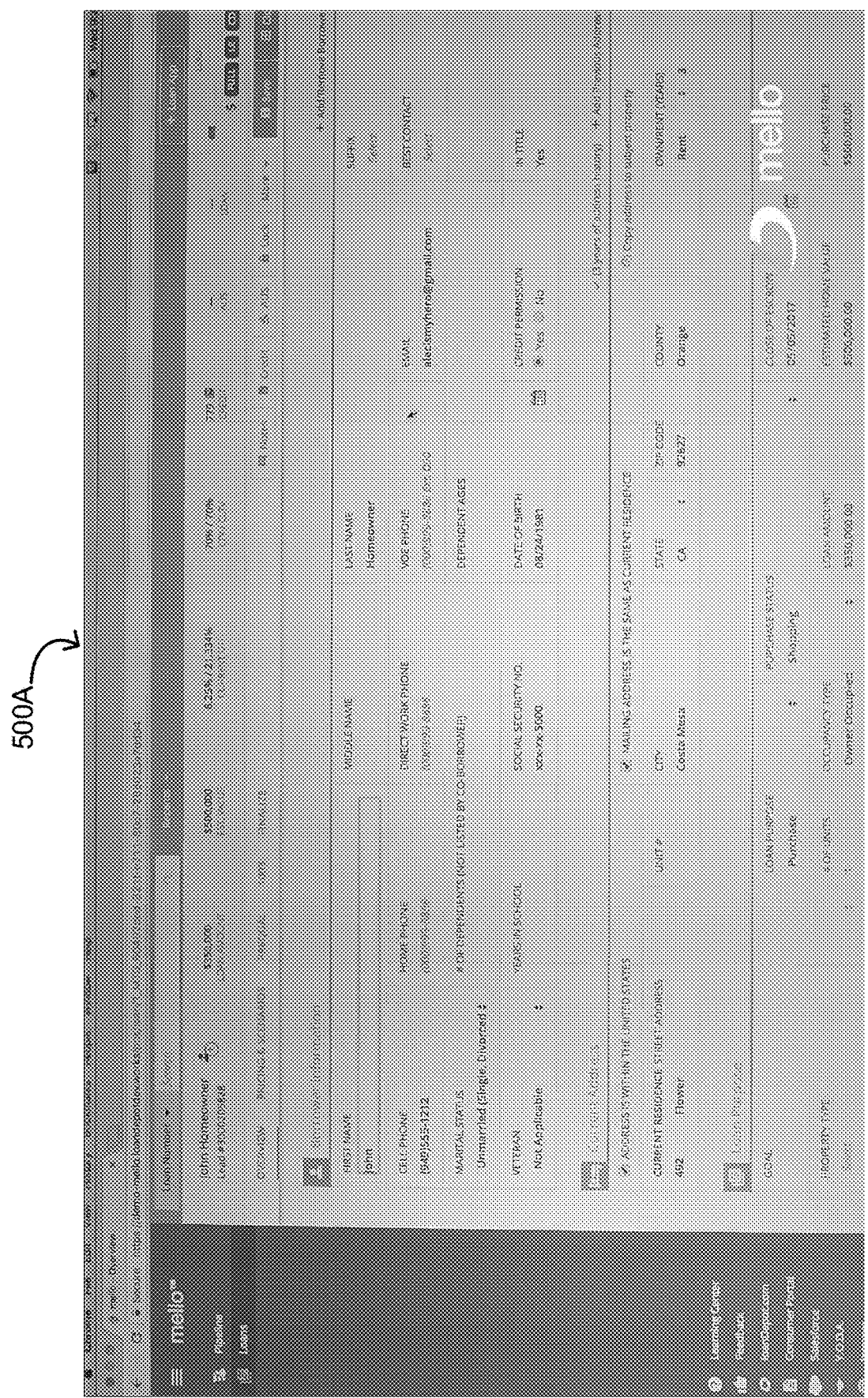

FIG. 5A provides an image of a first screen in a lender GUI of a web application in accordance with some embodiments.

Figure 5B:
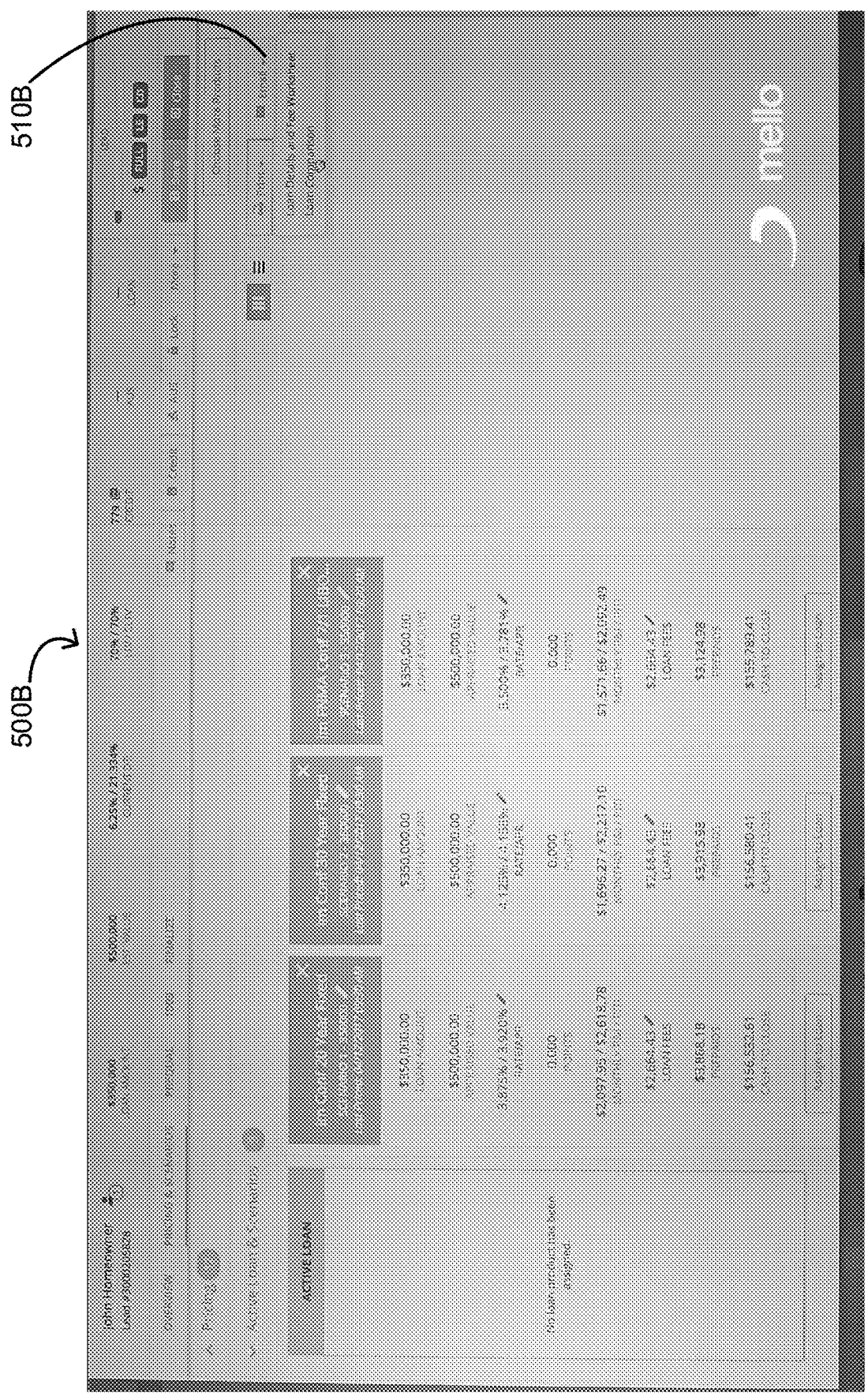

FIG. 5B provides an image of a second screen in a lender GUI of a web application in accordance with some embodiments.

Figure 5C:
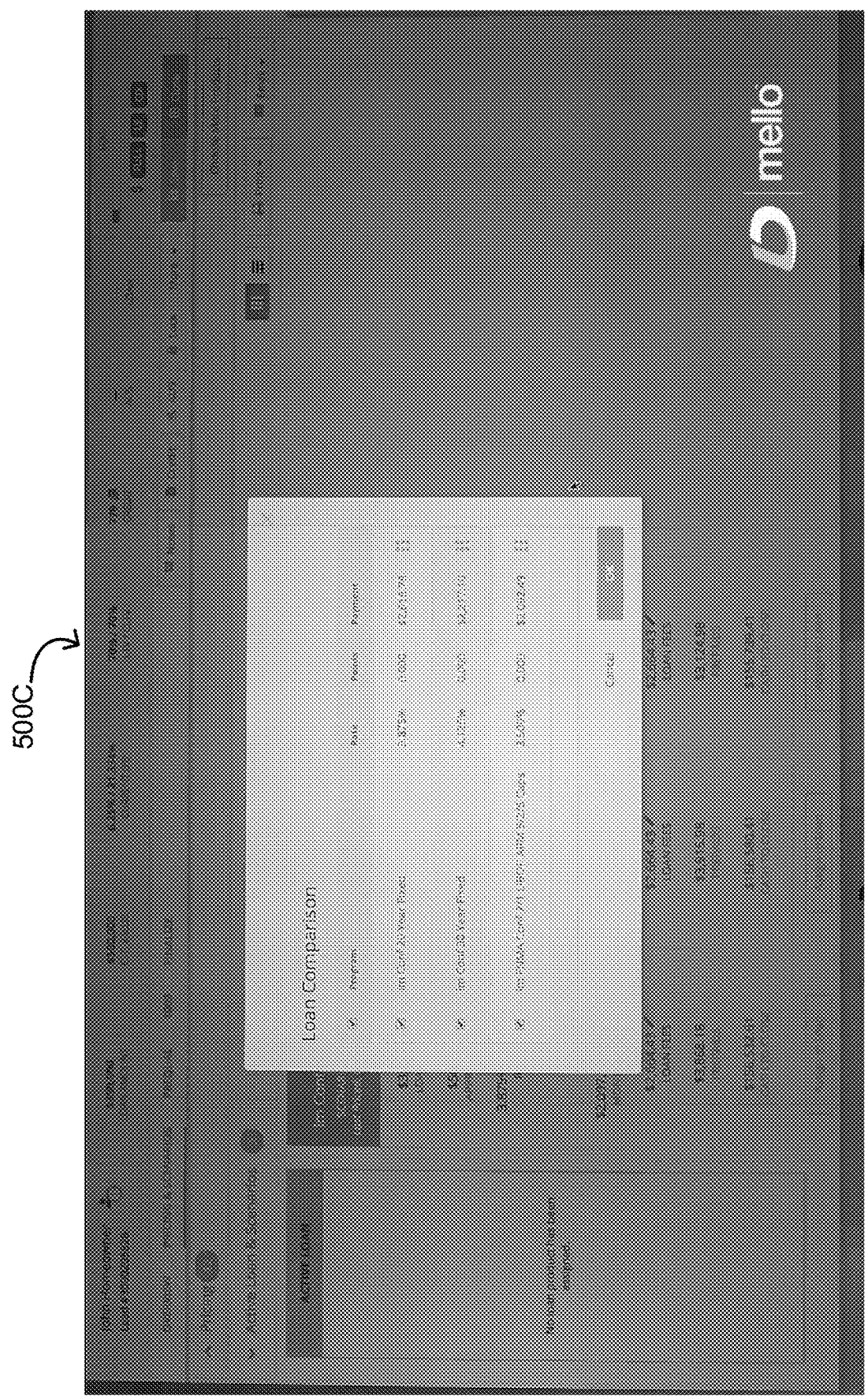

FIG. 5C provides an image of a third screen in a lender GUI of a web application in accordance with some embodiments.

Figure 5D:
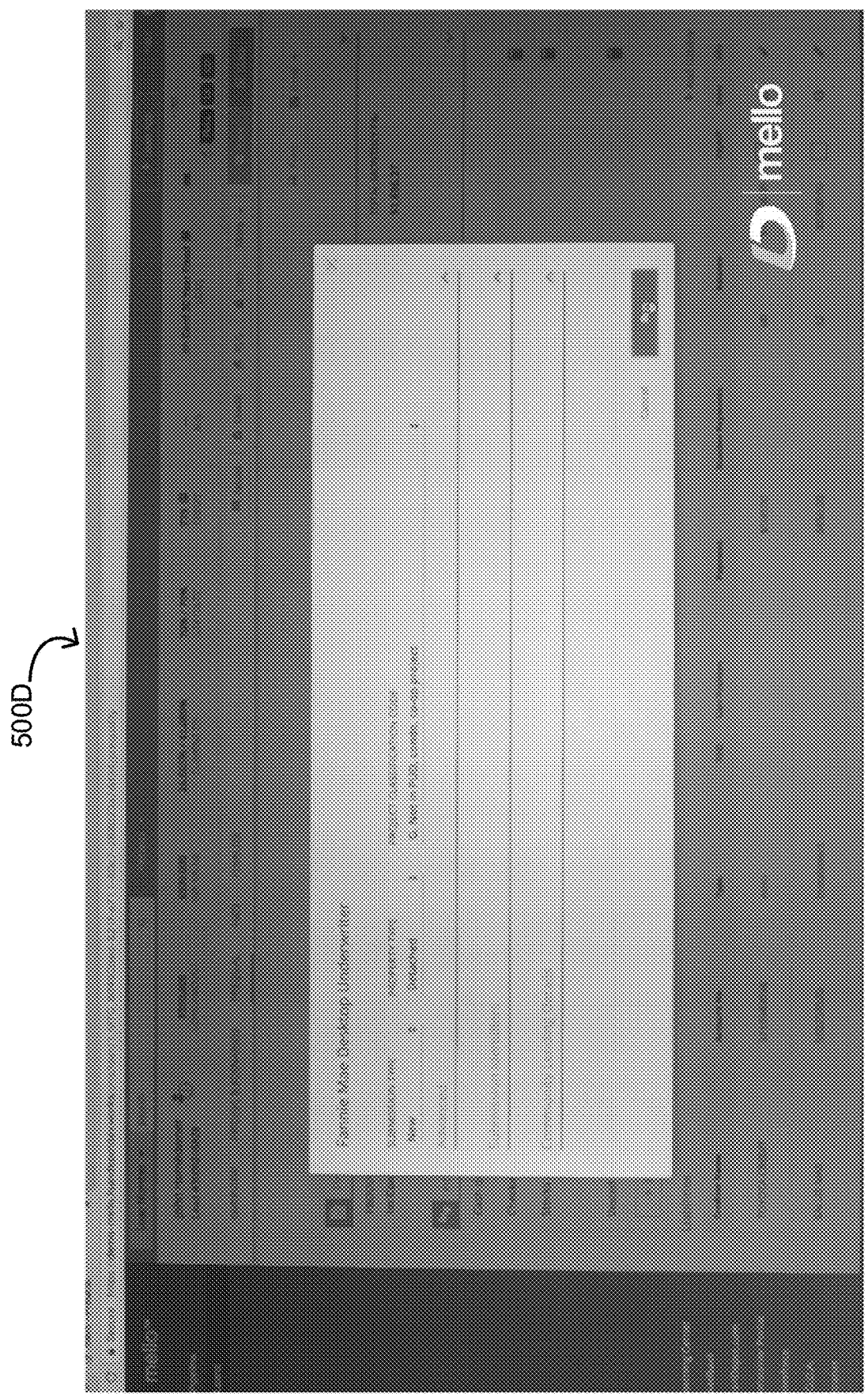

FIG. 5D provides an image of a fourth screen in a lender GUI of a web application in accordance with some embodiments.

Figure 5E:
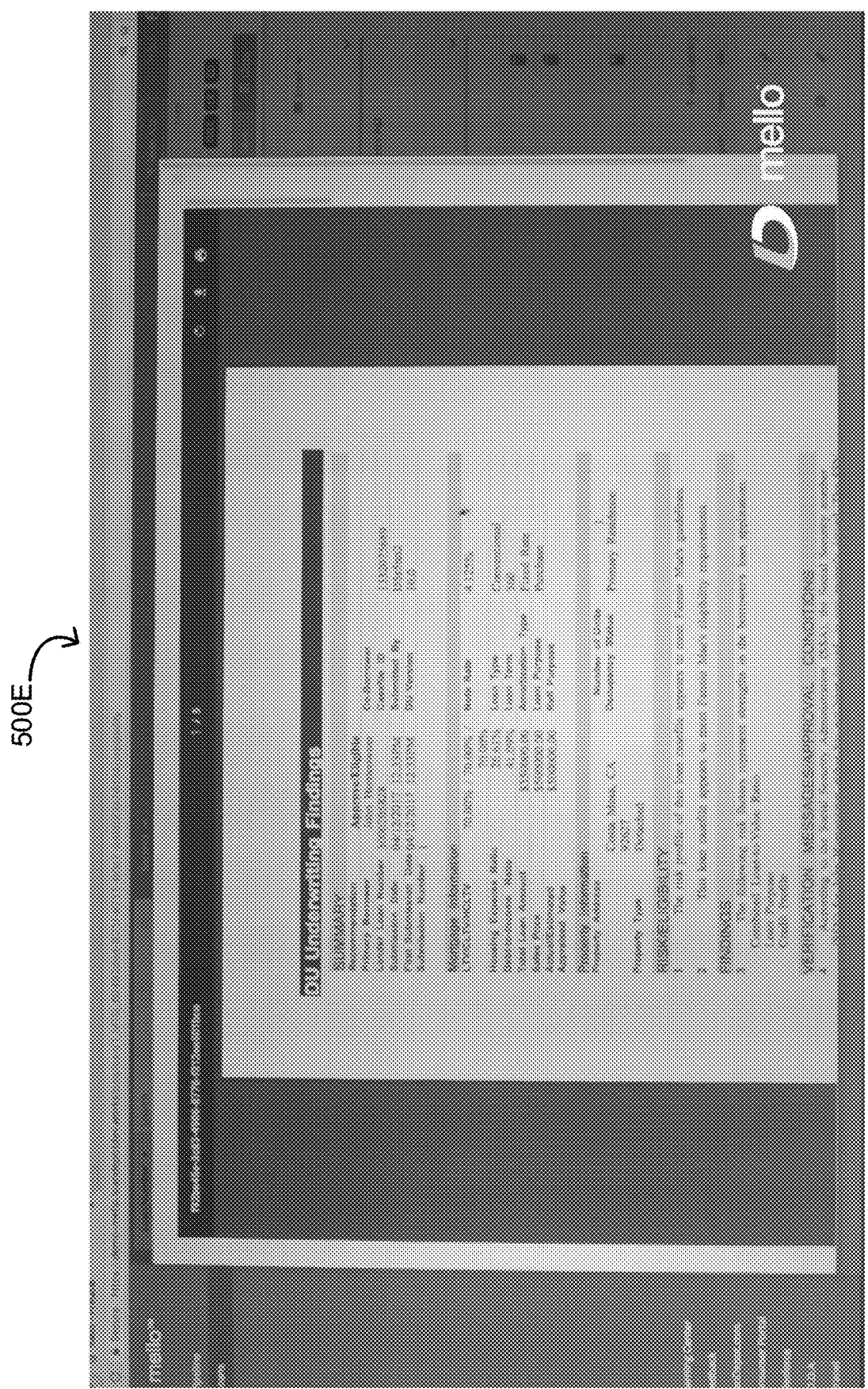

FIG. 5E provides an image of a fifth screen in a lender GUI of a web application in accordance with some embodiments.

Figure 6:
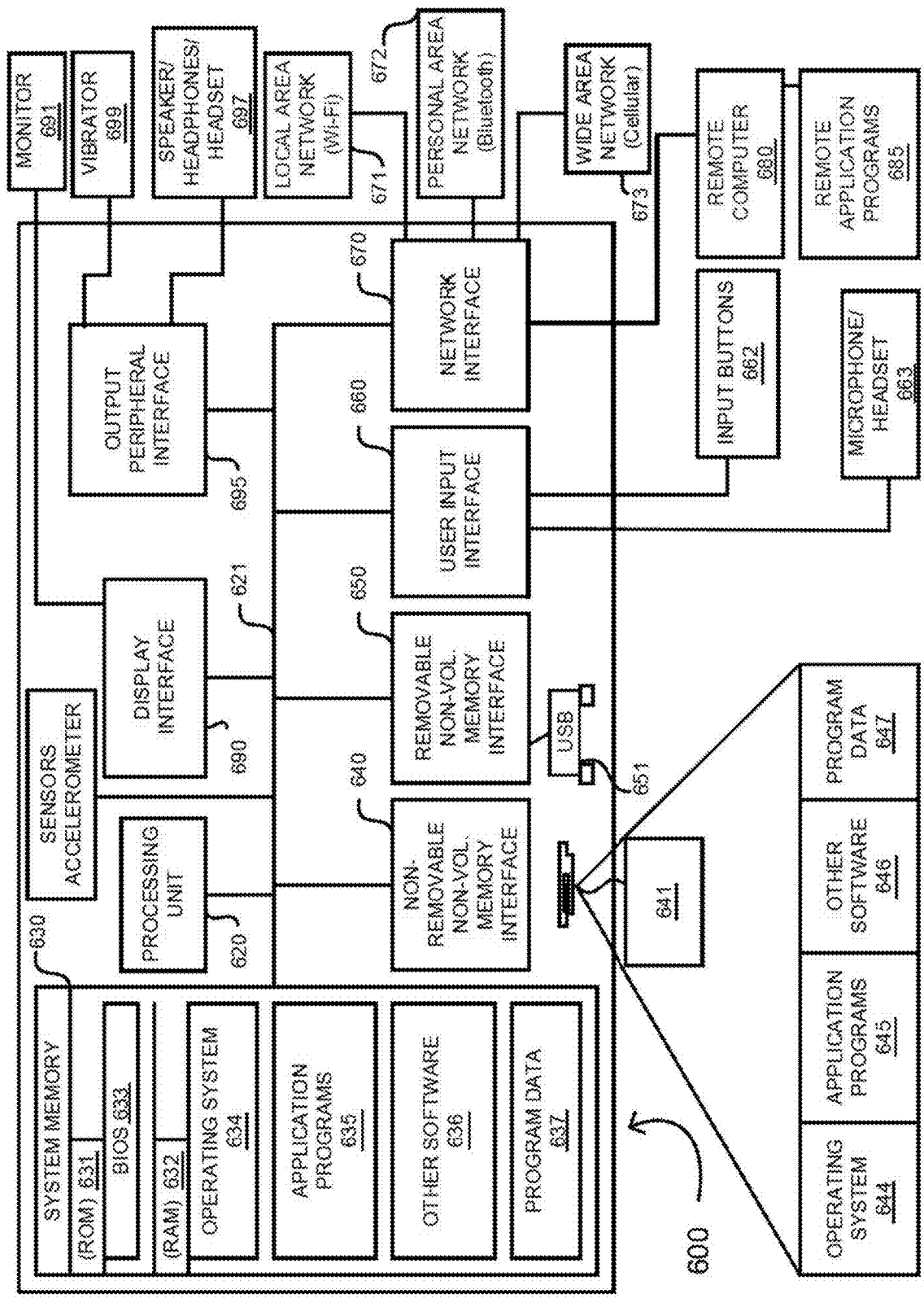

FIG. 6 provides a schematic illustrating components of a network host in accordance with some embodiments.

DESCRIPTION

Before some particular embodiments are provided in greater detail, it should be understood that the particular embodiments provided herein do not limit the scope of the concepts provided herein. It should also be understood that a particular embodiment provided herein can have features that can be readily separated from the particular embodiment and optionally combined with or substituted for features of any of a number of other embodiments provided herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

Unless defined otherwise, all technical and scientific terms used herein have the same meaning as commonly understood by those of ordinary skill in the art.

As previously set forth, lending requires many fragmented, often manual processes of both borrowers and lenders. Moreover, such processes are highly specific to loan type. This obviates any financial benefit from economies of scale that could otherwise be passed onto borrowers and lenders alike if such processes were more tightly integrated and generalized across the loan types. Accordingly, there is a need for a more highly automated, more tightly integrated lending platform that dissolves lines between lending for secured and unsecured loan types. Provided herein is at least a digital mortgage application and processes thereof in support of the lending platform.

FIG. 1 provides a schematic illustrating a digital lending platform 100 in accordance with some embodiments. The digital lending platform 100 includes networked hardware and software, as well as processes thereof, providing one or more of digital origination 110, a digital mortgage application 120, a digital mortgage loan 130, data enrichment 140, a web-based portal 150, marketing solutions 160, or a personal loan dashboard 170.

With respect to the digital origination 110, the digital origination 110 includes, but is not limited to, one or more of real-time pipeline views; quick credit runs; quick loan quotes; flexible loan comparisons; quick loan pre-qualifications; intuitive and interactive Uniform Residential Loan Applications; or loan approval notifications. Features and benefits of the digital origination 110 include, but are not limited to, one or more of 24/7 web-based pipeline visibility; access anytime from anywhere; reduced errors by way of using existing pricing and fee engines; quick creation of multiple loan scenarios; speedy fee worksheets; quick loan quotes; quick loan pre-qualifications; quick loan-locks; quick completion of Uniform Residential Loan Applications; or 100% visibility from the loan quotes to the loan locks.

With respect to the digital mortgage application 120, the digital mortgage application 120 includes, but is not limited to, one or more of finding loan officers or other lender representatives by lender name or branch; automated income and employment verifications; automated asset verifications; or quick application submissions. Features and benefits of the digital mortgage application 120 include, but are not limited to, one or more of automatic connections of borrowers with loan officers or other lender representatives; loan-officer notifications regarding completion of borrowers' applications; easy-to-collect information on borrowers and properties; use anytime from anywhere; or quick borrower completion and lender processing of applications.

With respect to the digital mortgage loan 130, the digital mortgage loan 130 includes, but is not limited to, one or more of 100% digital mortgage applications; automated income and employment verifications; automated asset verifications; immediate connections of borrowers to loan officers or other lender representatives; or quick loan approvals. Features and benefits of the digital mortgage loan 130 include, but are not limited to, one or more of self-service software applications for borrowers on mobile devices or personal computers; pricing for loan offers; loan locks; or quick applications anytime from anywhere.

With respect to the digital personal loan 130, the digital personal loan 130 includes, but is not limited to, one or more of quick risk-free quotes; automatic links to borrowers' bank accounts; uploading borrower identification by taking and uploading pictures; digital acceptance of loan packets; or quick auto-deposits of loan disbursements. Features and benefits of the digital personal loan 130 include, but are not limited to, one or more of quick pricing, locking, and loan offers 24/7 from anywhere; quick risk-free quotes; quick loan applications with bank lending; creation of new applications and generation of loan offers via proprietary credit decline, fraud and pricing engines; verification of borrower information and documentation, as well as fraud checks in a single view; or quick loan applications and funding.

With respect to data enrichment 140, features and benefits of the data enrichment 140 include, but are not limited to, one or more of infusing data seamlessly into the digital loan process; increased accuracy on loan applications; reduced potential for fraud; or accelerated verifications.

With respect to the web-based portal 150, the web-based portal 150 includes, but is not limited to, one or more of secure borrower portals; instant access to borrower's to-do lists; electronic signing of borrowers' documents; secure messaging for borrowers; or loan-team access for borrowers 24/7. Features and benefits of the web-based portal 150 include, but are not limited to, one or more of notifications to update lenders or their representatives on borrowers' activities; keeping borrowers connected and in sync with various loan processes; 24/7 accessibility and visibility on multiple devices; secure document uploads in a secure environment; collection of documentation for loan officers or other lender representatives; reduction in turn times and fall out rates; or increased speed and efficiencies.

With respect to the personal loan dashboard 170, the personal loan dashboard 170 includes, but is not limited to, one or more of registration pages; information and documentation verifications; one-click repricing; disposition applications; call recording for confirmation of borrower understanding; or pipeline management. Features and benefits of the personal loan dashboard 170 include, but are not limited to, one or more of a Certified Lender Program ("CLP") agent portal coupled to a proprietary loan origination system; seamless workflow management; or one-portal access to all loan processes.

FIGS. 2A-2C and 3 provide schematics illustrating a network 200 of client and server hosts supporting the digital mortgage application system 120 in accordance with some embodiments. FIG. 2B provides a schematic illustrating a borrower's client host 250 and one or more server hosts such as server hosts 210, 220, and 230 supporting the digital mortgage application system 120. FIG. 2C provides a schematic illustrating a lender's client host 260 and the one or more server hosts supporting the digital mortgage application system 120. FIG. 3 provides a schematic illustrating the digital mortgage application system 120 with a number of modules or components thereof in accordance with some embodiments.

As shown in FIGS. 2A-C and 3, the digital mortgage application system 120 includes a first web application 350 configured to run at least in part from a primary memory of a first client host such as the borrower's client host 250 (e.g., mobile device, personal computer, etc.), a second web application 360 configured to run at least in part from a primary memory of a second client host such as the lender's client host 260 (e.g., personal computer, mobile device, etc.), and a digital mortgage application stack 300 configured to run at least in part from a primary memory of at least one server host such as any one or more of server hosts 210, 220, or 230. While much of the digital mortgage application system 120 is described herein in terms of web applications for client hosts, it should be understood that such client host can alternatively run local applications native to the operating systems of the client hosts.

The digital mortgage application stack 300 includes a web server 310, a separate mobile web server 312 if not integrated with the web server 310, a digital mortgage application server 320, a database server 330 with an associated database 332, and an e-mail server 340 configured to send and receive secured e-mail messages.

The digital mortgage application server 320 includes a first web application server module 322 configured to service requests from one of more client hosts such as the borrower's client host 250 for the first web application 350. In some embodiments, the first web application server module 322 is a mobile web application server module configured to service requests from one of more mobile devices (e.g., smart phones, tablet computers, etc.) for a mobile web application version of the first web application 350. The digital mortgage application server 320 further includes a second web application server module 324 configured to service requests from one of more client hosts such as the lender's client host 260 for the second web application 360. In some embodiments, the second web application server module 324 is a mobile web application server module configured to service requests from one of more mobile devices (e.g., smart phones, tablet computers, etc.) for a mobile web application version of the first web application 350.

The digital mortgage application server 320 further includes an OCR module 326 configured to recognize text in borrowers' digital photograph files or other image-based files, extract the text from the digital photograph files or the other image-based files, and provide the text by way of the web server 310 for automated information-filling processes in digital mortgage applications. Such automated information-filling processes, which are among many described herein, can be used to at least complement borrower-provided information, thereby providing data enrichment, as well as cross checks for the borrower-provided information.

The digital mortgage application server 320 further includes an automated underwriting module 328 configured to perform detailed risk assessments in view of borrower-related information for automatically underwriting one or more potential loans per borrower for discussion with a lender representative.

FIGS. 4A-4H provide images of various screens 400A-400H in a borrower GUI of the first web application 350 in accordance with some embodiments.

The first web application 350 is configured to present the borrower GUI within a web browser on a display of the first client host such as the borrower's client host 250. In some embodiments, the first web application 350 is a mobile web application configured to present the borrower GUI within a mobile web browser on a touchscreen of a mobile device as the first client host. The borrower GUI includes a digital mortgage application divided into a number of borrower-fillable sections configured to hold borrower-related information. The sections configured to hold the borrower-related information include one or more sections selected from a borrower profile section (see FIGS. 4A and 4B), a subject property section (see FIG. 4G), an employment history section (see FIGS. 4C and 4D), and an income-and-asset information section (see FIGS. 4E and 4F). Some of the sections are configured for optionally automatically filling in one or more portions of the borrower-related information. In such sections, one or more user-operable graphical elements (e.g., on-screen buttons) per section are configured to commence the information-filling process for that section automated by one or more servers (e.g., the web server 310, the digital mortgage application server 320, the database server 330, or a combination thereof) of the digital mortgage application stack 300 upon activation of the one or more graphical elements. The sections are configured to hold the borrower-related information at least until transferred to the database server 330 and stored in the database 332 on a storage device of, for example, the server host 230.

FIG. 4A provides an image of a first screen 400A in the borrower GUI of the web application 350 in accordance with some embodiments. FIG. 4B provides an image of a second screen 400B in a borrower GUI of the web application 350 in accordance with some embodiments.

As shown, the first screen 400A and the second screen 400B of the borrower GUI include the borrower profile section of the number of borrower-fillable sections of the digital mortgage application. The first screen 400A is configured with a first on-screen button 410A for taking a digital photograph of an item of borrower identification such as a state driver's license upon activation of the first on-screen button 410A. Likewise, the second screen 400B is configured with a first on-screen button 410B for taking a digital photograph of an item of borrower identification such as a state driver's license upon activation of the first on-screen button 410B. In addition, the second screen 400B is configured with at least two additional on-screen buttons for finding existing digital photograph files or other image-based files instead of taking digital photographs, a first additional on-screen button 412B of which is configured for browsing locally for and selecting such existing files, and a second additional on-screen button 414B of which is configured for browsing a cloud-based repository and selecting such existing files. The borrower profile section is optionally configured with a second on-screen button (not shown) for sending a digital photograph file of a borrower-approved digital photograph or another image-based file of the item of borrower identification upon activation of the second on-screen button. The borrower GUI is configured to present the second on-screen button for sending the digital photograph file or the other image-based file of the item of borrower identification to the digital mortgage application stack 300 if the first on-screen button 410A or 410B is not configured for taking a digital photograph and subsequently sending the associated digital photograph file upon the activation of the first on-screen button 410A or 410B. Likewise, the borrower GUI is configured to present the second on-screen button for sending the digital photograph file or the other image-based file of the item of borrower identification to the digital mortgage application stack 300 if the first additional on-screen button 412B or the second additional on-screen button 414B is not configured for selecting a digital photograph file or another image-based file and subsequently sending the file upon the activation of the first additional on-screen button 412B or the second additional on-screen button 414B.

While not shown, one or more screens of the borrower GUI include the subject property section of the number of borrower-fillable sections of the digital mortgage application, at least one screen of which is configured with an on-screen button configured to send a unique identifier for a real estate property to the digital mortgage application stack 300 upon activation of the on-screen button. The unique identifier for the real estate property can be a multiple listings service ("MLS") number, a property address, or a parcel number for the real estate property. The digital mortgage application stack 300 is configured to fetch listing information for the real estate property from one or more MLS databases for the automated information-filling process.

FIG. 4C provides an image of a third screen 400C in the borrower GUI of the web application 350 in accordance with some embodiments. FIG. 4D provides an image of a fourth screen in the borrower GUI of the web application 350 in accordance with some embodiments.

As shown, the third screen 400C and the fourth screen 400D of the borrower GUI include the employment history section of the number of borrower-fillable sections of the digital mortgage application. The third screen 400C is configured with a first on-screen button 410C for sending one or more borrower identifiers to the digital mortgage application stack 300 upon activation of the on-screen button 410C. The digital mortgage application stack 300 is configured to fetch employment history information such as employers, positions, compensation, start and end dates, and the like for the borrower from one or more employers, one or more third-party employment verification providers, or a combination thereof for the automated information-filling process. The fourth screen 400D shows such employment history, which employment history is held in the employment history section at least until transferred to the database server 330 and stored in the database 332 on a storage device of, for example, the server host 230.

FIG. 4E provides an image of a fifth screen 400E in the borrower GUI of the web application 350 in accordance with some embodiments. FIG. 4F provides an image of a sixth screen 400F in the borrower GUI of the web application 350 in accordance with some embodiments.

As shown, the fifth screen 400E and the sixth screen 400F of the borrower GUI include the income-and-asset information section of the number of borrower-fillable sections of the digital mortgage application. The fifth screen 400E is configured with an on-screen button 410E for approving one or more links of the digital mortgage application system 120 respectively to one or more financial accounts upon activation of the on-screen button 410E. The sixth screen 400F shows one or more successful links of the digital mortgage application system 120 to the one or more financial accounts.

While not shown, one or more screens of the borrower GUI of the income-and-asset information section include one or more on-screen buttons configured to send financial account identifiers, financial account authorization information, or both to the digital mortgage application stack 300 upon activation of the one or more on-screen buttons. For example, in a first screen of the borrower GUI of the income-and-asset information section, a first on-screen button is configured to send one or more financial account identifiers to the digital mortgage application stack 300 upon activation of the first graphical button. Likewise, in a second screen of the borrower GUI of the income-and-asset information section, a second on-screen button is configured to send financial account authorization information to the digital mortgage application stack 300 upon activation of the second on-screen button. Upon receipt of the one or more financial account identifiers and the financial account authorization information, the digital mortgage application system 120 is configured to link the one or more financial accounts upon approval by way of, for example, the on-screen button 410E, for the automated information-filling process.

FIG. 4G provides an image of a seventh screen 400G in the borrower GUI of the web application in accordance with some embodiments. FIG. 4H provides an image of an eighth screen 400H in the borrower GUI of the web application 350 in accordance with some embodiments.

As shown, the seventh screen 400G and the eighth screen 400H of the borrower GUI hold the borrower-related information in the number of sections (e.g., the borrower profile section, the subject property section, and the income-and-asset information section) of the digital mortgage application for borrower review and submission to the digital mortgage application stack 300. The eighth screen 400H, which can be a scrollable extension of the seventh screen 400G, is configured with a first on-screen button 410H for confirming the borrower-related information and sending the borrower-related information to the digital mortgage application stack 300 upon activation of the on-screen button 410H. The number of sections of the digital mortgage application are configured to hold the borrower-related information at least until transferred to the database server 330 and stored in the database 332 on a storage device of, for example, the server host 230.

FIGS. 5A-5E provide images of various screens in a lender GUI of the second web application 360 in accordance with some embodiments.

The second web application 360 is configured to present the lender GUI within a web browser on a display of the second client host such as the lender's client host 260. The lender GUI includes one or more digital mortgage applications of one or more borrowers allowing a representative of a lender such as a loan officer to at least review borrower-related information in the one or more digital mortgage applications of the one or more borrowers. Each of the digital mortgage applications is divided into a number of sections configured to hold borrower-related information. The sections configured to hold the borrower-related information include one or more sections selected from a borrower profile section, a subject property section, an employment history section, and an income-and-asset information section. However, each digital mortgage application in the lender GUI can include additional sections, and some of the sections that tightly correspond to sections of the digital mortgage application in the borrower GUI can be further divided into subsections. Such sections or subsections can include lender information complementary to borrower-provided information such as borrower-related information obtained from third parties (e.g., borrower credit rating), risk assessment information (e.g., real estate appraisal value, loan-to-value ratio, etc.), and the like. The sections that tightly correspond to the sections of the digital mortgage application in the borrower GUI are populated with borrower-provided information when transferred from one or more client hosts to the one or more server hosts including the database server 330 and stored in the database 332 on a storage device of, for example, the server host 230.

FIG. 5A provides an image of a first screen 500A in the lender GUI of the web application 360 in accordance with some embodiments.

As shown, the first screen 500A of the lender GUI includes a number of sections of a digital mortgage application for a single borrower. Again, the sections are configured to hold borrower-related information and include one or more sections selected from a borrower profile section, a subject property section, an employment history section, and an income-and-asset information section. However, the digital mortgage application in the lender GUI can include additional sections, and some of the sections that tightly correspond to sections of the digital mortgage application in the borrower GUI can be further divided into subsections.

FIG. 5B provides an image of a second screen 500B in the lender GUI of the web application 360 in accordance with some embodiments. FIG. 5C provides an image of a third screen 500C in the lender GUI of the web application 360 in accordance with some embodiments.

As shown, the second screen 500B and the third screen 500C of the lender GUI include a number of user-operable graphical elements configured for presentation of one or more potential loans to a representative of a lender for at least discussion with a borrower. Presentation of each loan of the one or more potential loans includes presentation of one or more loan details selected from a loan amount, a real estate appraisal value, a loan rate, an annual percentage rate ("APR"), any points, a monthly principle and interest payment, a monthly principle, interest, property taxes, and insurance ("PITT") payment, loan fees, prepaid items at closing, and cash to close. If there are two or more potential loans for discussion with the borrower, the loan details for the two or more loans can be presented side-by-side as in the second screen 500B of the lender GUI. Higher level details for the two or more loans can be compared side-by-side as in the third screen 500C of the lender GUI. This is helpful for discussion of some essential loan parameters such as loan rate, any points, and monthly principle payment.

As shown in FIG. 5B, the second screen 500B of the lender GUI further includes a number of user-operable graphical elements including an on-screen button 510B configured to allow the representative of the lender to send secured e-mail messages through the lender GUI by way of the e-mail server 340. The secured e-mail messages include automatic e-mail headers (e.g., lender-representative sender, borrower recipient, date, and subject) and attachments determined in accordance with a focus in the lender GUI on a particular borrower and loan process step.

FIG. 5D provides an image of a fourth screen 500D in the lender GUI of the web application 360 in accordance with some embodiments. FIG. 5E provides an image of a fifth screen 500E in the lender GUI of the web application 360 in accordance with some embodiments.

As shown, the fourth screen 500D of the lender GUI includes a number of user-operable graphical elements configured to interface with the automated underwriting module 328 of the digital mortgage application server 320. The fifth screen 500E of the lender GUI includes a document viewer configured for viewing findings from the automated underwriting module 328 subsequent to performing a detailed risk assessment in view of borrower-related information in the digital mortgage application.

FIG. 6 provides a schematic illustrating components of a network host 600 such as the borrower's client host 250, the lender's client host 260, or any one of the server hosts 210, 220, and 230 in accordance with some embodiments. Components of the network host 600 vary in accordance with host type (e.g., mobile device, personal computer, etc.). For example, the network host 600 configured as the borrower's client host 250 (e.g., a smart phone or a tablet computer) need not include the same components as the network host 600 configured as the lender's client host 260 (e.g., personal computer), which network host 600 need not include the same components as the network host 600 configured as one of the server hosts 210, 220, or 230. As such, each and every component shown and described in reference to FIG. 6 need not be included in each host type. Furthermore, each host type can further include components not shown or described in reference to FIG. 6 but otherwise described herein.

As shown, components of the network host 600 can include, but are not limited to, a processing unit 620 having one or more processing cores, a primary or system memory 630, and a system bus 621 that couples various system components including the system memory 630 to the processing unit 620. The system bus 621 can be any of several types of bus structures selected from a memory bus or memory controller, a peripheral bus, and a local bus using any of a variety of bus architectures.

The network host 600 can include a variety of computer-readable media. Computer-readable media can be any media that can be accessed by the network host 600 and includes both volatile and nonvolatile media, as well as removable and non-removable media. By way of example, and not limitation, use of computer-readable media includes storage of information, such as computer-readable instructions, data structures, other executable software, or other data. Computer-readable media includes, but is not limited to, RAM, ROM, EEPROM, flash memory or other memory technology, CD-ROM, digital versatile disks ("DVD") or other optical disk storage, magnetic cassettes, magnetic tape, magnetic disk storage or other magnetic storage devices, or any other tangible medium that can be used to store the desired information for access by the network host 600. Transitory media such as wireless channels are not included in the computer-readable media. Communication media typically embody computer-readable instructions, data structures, other executable software, or other transport mechanisms and includes any information delivery media. As an example, some client hosts on a network might not have optical or magnetic storage.

The system memory 630 includes computer-readable media in the form of volatile or nonvolatile memory such as read only memory ("ROM") 631 and random-access memory ("RAM") 632. A basic input-output system 633 ("BIOS") containing the basic routines that help to transfer information between elements within the network host 600, such as during start-up, is typically stored in ROM 631. RAM 632 typically contains software or data that are immediately accessible for operations by the processing unit 620. By way of example, and not limitation, FIG. 6 illustrates that RAM 632 can include a portion of the operating system 634, application programs 635, other executable software 636, and program data 637.

The network host 600 can also include other computer-readable media. By way of example only, FIG. 6 illustrates a solid-state memory 641. Other computer-readable media that can be used in the example operating environment include, but are not limited to, universal serial bus ("USB") drives and devices, flash memory cards, solid state RAM, solid state ROM, or the like. The solid-state memory 641 is typically connected to the system bus 621 through a non-removable memory interface such as interface 640, and USB drive 651 is typically connected to the system bus 621 by a removable memory interface such as interface 650.

The drives and their associated computer-readable media provide storage of computer-readable instructions, data structures, other executable software, or other data for the network host 600. In FIG. 6, for example, the solid-state memory 641 is illustrated for storing operating system 644, application programs 645, other executable software 646, or program data 647. Note that these components can either be the same as or different from operating system 634, application programs 635, other executable software 636, and program data 637. Operating system 644, application programs 645, other executable software 646, and program data 647 are given different numbers here to illustrate that, at a minimum, they are different copies.

A user can enter commands and information into the network host 600 through input devices such as a keyboard, touchscreen, or software or hardware input buttons 662, a microphone 663, a pointing device such as a mouse, or scrolling input component such as a trackball or touch pad. The microphone 663 can cooperate with speech recognition software. These and other input devices are often connected to the processing unit 620 through a user input interface 660 that is coupled to the system bus 621 but can be connected by other interface and bus structures, such as a parallel port, game port, or USB. A display monitor 691 or other type of display screen device is also connected to the system bus 621 via an interface such as a display interface 690. In addition to the monitor 691, the network host 600 can also include other peripheral output devices such as speakers 697, a vibrator 699, and other output devices, which can be connected through an output peripheral interface 695.

The network host 600 can operate in a networked environment using logical connections to one or more other network hosts such as network host 680. Like the network host 600, the network host 680 can be a personal computer, a mobile device, a server, a router, a network PC, a peer device, or another network node. The logical connections depicted in FIG. 6 can include a personal area network ("PAN") 672 (e.g., Bluetooth®), a local area network ("LAN") 671 (e.g., Wi-Fi), and a wide area network ("WAN") 673 (e.g., cellular network), but can also include other networks such as a personal area network (e.g., Bluetooth®). Such networking environments are commonplace in offices, enterprise-wide computer networks, intranets and the Internet. A browser application can be resident on the network host 600 and stored in the memory.

When used in a LAN networking environment, the network host 600 is connected to the LAN 671 through a network interface or adapter 670, which can be, for example, a Bluetooth® or Wi-Fi adapter. When used in a WAN networking environment (e.g., Internet), the network host 600 can include some means for establishing communications over the WAN 673. With respect to mobile telecommunication technologies, for example, a radio interface, which can be internal or external, can be connected to the system bus 621 via the network interface 670, or another appropriate mechanism. In a networked environment, other software depicted relative to the network host 600, or portions thereof, can be stored in the remote memory storage device. By way of example, and not limitation, FIG. 6 illustrates remote application programs 685 as residing on the network host 680. It will be appreciated that the network connections shown are examples and other means of establishing a communications link between the network hosts can be used.

As discussed, the network host 600 can include a processing unit 620, a memory (e.g., ROM 631, RAM 632, etc.), a built-in battery to power the network host 600 if a mobile device, an AC power input to charge the battery, a display screen, built-in Wi-Fi circuitry to wirelessly communicate with other network host connected to network.

Another device that can be coupled to system bus 621 is a power supply such as a DC power supply (e.g., battery) or an AC adapter circuit. As discussed above, the DC power supply can be a battery, a fuel cell, or similar DC power source that needs to be recharged on a periodic basis. A wireless communication module can employ a Wireless Application Protocol to establish a wireless communication channel. The wireless communication module can implement a wireless networking standard.

In some embodiments, software used to facilitate algorithms discussed herein can be embodied into a non-transitory computer-readable medium. A computer-readable medium includes any mechanism that stores information in a form readable by a computer. For example, a non-transitory machine-readable medium can include read only memory ("ROM"); random access memory ("RAM"); magnetic disk storage media; optical storage media; flash memory devices; Digital Versatile Discs ("DVDs"), EPROMs, EEPROMs, FLASH memory, magnetic or optical cards, or any type of media suitable for storing electronic instructions.

An application described herein includes, but is not limited to, software applications, mobile applications, and programs that are part of an operating system or integrated with or on an application layer thereof. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C+, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a network host, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry.

A non-transitory CRM including executable instructions can be executed on a server host such as any one or more of the server hosts 210, 220, or 230 by one or more processors to cause the server host to instantiate at least a portion of the digital mortgage application system 120 described herein. Once instantiated, the server host can run the digital mortgage application stack 300 at least in part from a primary memory of the server host. Running the digital mortgage application stack 300 includes running a web server such as the web server 310, a digital mortgage application server such as the digital mortgage application server 320, and a database server such as the database server 330 configured to service requests from one or more client hosts.

The server host can also service at least a first request for a mobile web application such as the first web application 350 from a first client host such as the borrower's client host 250. Servicing at least the first request for the mobile web application from the first client host includes providing the mobile web application such that the mobile web application runs at least in part from a primary memory of a mobile device configured as the first client host. The mobile web application is configured to present a borrower GUI within a mobile web browser on a touchscreen of the mobile device. The borrower GUI includes a digital mortgage application divided into a number of borrower-fillable sections configured to hold borrower-related information, some of which sections are configured for optionally automatically filling in one or more portions of the borrower-related information.

The server host can also service at least a second request for a web application such as the second web application 360 from a second client host such as the lender's client host 260. Servicing at least the second request for the web application from the second client host includes providing the web application such that the web application runs at least in part from a primary memory of a personal computer configured as the second client host. The web application is configured to present a lender GUI within a web browser on a display of the personal computer. The lender GUI is configured to allow a representative of the lender to review information in one or more digital mortgage applications of one or more borrowers.

The server host can also receive by the database server 330 the borrower-related information from the first client host and storing the borrower-related information in a database such as the database 332 on a storage device of the server host such as the server host 230. The number of sections configured to the hold borrower-related information until sent to the database server 330 include a borrower profile section, a subject property section, an employment history section, an income-and-asset information section, or a combination thereof.

The server host can also commence a section-specific information-filling process of the one or more portions of the borrower-related information. The information-filling process is automated by the servers of the digital mortgage application stack 300 upon activation of one or more user-operable graphical elements in each section of the number of sections of the borrower-related information.

The server host can also receive by the digital mortgage application stack 300 a digital photograph file from the first client host. The digital photograph file is received by the digital mortgage application stack 300 subsequent to activation of at least a first graphical button in a borrower profile section of the number of sections configured to take a digital photograph of an item of borrower identification. Either the first graphical button or an optional second graphical button in the borrower profile section is configured to send the digital photograph file to the digital mortgage application stack 300 for the automated information-filling process.

The server host can also recognize text and extracting the text from the digital photograph file with an OCR module such as the OCR module 326 of the digital mortgage application server 320. In addition, the number of steps further includes sending the text by way of the web server 310 to the first client host for the automated information-filling processes.

The server host can also fetch listing information for a real estate property from one or more multiple listings service databases and sending the listing information by way of the web server 310 to the first client host for the automated information-filling process. Fetching and sending the listing information is upon receipt of a unique identifier for the real estate property from the first client host subsequent to activation of a graphical button in a subject property section of the number of sections. The graphical button in the subject property section is configured to send the unique identifier for the real estate property to the digital mortgage application stack 300 for the automated information-filling process.

The server host can also fetch employment history information for the borrower and sending the employment history information by way of the web server 310 to the first client host for the automated information-filling process. Fetching the employment history information includes fetching the employment history information from one or more employers, one or more third-party employment verification providers, or a combination thereof. Fetching and sending the employment history information is upon receipt of one or more borrower identifiers from the first client host subsequent to activation of a graphical button in an employment history section of the number of sections. The graphical button in the employment history section is configured to send one or more borrower identifiers to the digital mortgage application stack 300 for the automated information-filling process.

The server host can also receive one or more financial account identifiers from the first client host, receiving financial account authorization information from the first client host, and linking one or more financial accounts for the automated information-filling process. Receiving the one or more financial account identifiers is upon activation of a first graphical button in an income-and-asset information section of the number of sections configured to send the one or more financial account identifiers to the digital mortgage application stack 300 for the automated information-filling process. Receiving the financial account authorization is upon activation of a second graphical button in the income-and-asset information section configured to send the financial account authorization information to the digital mortgage application stack 300 for the automated information-filling process.

The server host can also perform a detailed risk assessment with an automated underwriting module such as the automated underwriting module 328 of the digital mortgage application server 320 in view of the borrower-related information for at least discussion of one or more potential loans per borrower with the representative of the lender.

The server host can also send one or more secured e-mail messages by way of an e-mail server such as the e-mail server 340 of the digital mortgage application stack 300 upon request by the representative of the lender through the lender GUI. E-mail headers and attachments are automatically determined in accordance with a focus in the lender GUI on a particular borrower and loan process step.

While some particular embodiments have been provided herein, and while the particular embodiments have been provided in some detail, it is not the intention for the particular embodiments to limit the scope of the concepts presented herein. Additional adaptations and/or modifications can appear to those of ordinary skill in the art, and, in broader aspects, these adaptations and/or modifications are encompassed as well. Accordingly, departures can be made from the particular embodiments provided herein without departing from the scope of the concepts provided herein.

What is claimed is:

1. A digital mortgage application system comprising:
   a borrower web application configured to run at least in part from a primary memory of a personal computer and present a borrower graphical user interface ('GUI') within a web browser on a display of the personal computer, the borrower GUI including a digital mortgage application divided into a plurality of borrower-fillable sections configured to hold borrower-related information, some of which sections are configured for optionally automatically filling in one or more portions of the borrower-related information, wherein the borrower-fillable sections include a borrower profile section, a subject property section, an employment history section, and an income-and-asset information section, each section including one or more user-operable graphical elements configured to commence a respective automated information-filling process upon activation;
   a lender web application configured to run at least in part from a primary memory of a personal computer and present a lender GUI within a web browser on a display of the personal computer, the lender GUI configured to allow a representative of the lender to review borrower information in one or more digital mortgage applications of one or more borrowers, wherein the lender GUI includes functionality to send secured email messages with automatic headers and attachments based on a focus in the lender GUI on a particular borrower and loan process step;
   a digital mortgage application stack configured to run at least in part from a primary memory of at least one server host, the digital mortgage application stack including a web server, a digital mortgage application server, and a database server;
   performing, by the server, a data enrichment process including verifying extracted data and utilizing an optical character recognition ("OCR") module to recognize text in borrowers' digital photograph files or other image-based files, extract the text from the digital photograph files or the other image-based files, and provide the text for automated information-filling processes;
   information and documentation verifications, and wherein a Certified Lender Program ("CLP") agent portal is coupled to a proprietary loan origination system;
   an automated underwriting module configured to perform one or more detailed risk assessments in view of borrower-related information for automatically underwriting one or more potential loans per borrower, wherein subsequent to performing a detailed risk assessment, the lender GUI includes a document viewer configured for viewing findings from the automated underwriting module; and
   wherein a subject property section of the plurality of sections is configured with a graphical button configured to send a unique identifier for a real estate property to the digital mortgage application stack upon activation of the graphical button for fetching listing information for the real estate property from one or more multiple listings service databases for the automated information-filling process.

2. The digital mortgage application system of claim 1, wherein a borrower profile section of the plurality of sections is configured with a first graphical button configured to take a digital photograph of an item of borrower identification upon activation of the first graphical button and an optional second graphical button to send a borrower-approved digital photograph to the digital mortgage application stack upon the activation of the first graphical button or activation of the optional second graphical button, if present, for an automated information-filling process.

3. The digital mortgage application system of claim 1, wherein an employment history section of the plurality of sections is configured with a graphical button configured to send one or more borrower identifiers to the digital mortgage application stack upon activation of the graphical button for fetching employment history information for the borrower from one or more employers, one or more third-party employment verification providers, or a combination thereof for the automated information-filling process.

4. The digital mortgage application system of claim 1, wherein an income-and-asset information section of the plurality of sections is configured with a first graphical button configured to send one or more financial account identifiers to the digital mortgage application stack upon activation of the first graphical button and a second graphical button to send financial account authorization information to the digital mortgage application stack upon activation of the second graphical button, thereby linking one or more financial accounts for the automated information-filling process.

5. The digital mortgage application system of claim 1, wherein the digital mortgage application server includes an automated underwriting module configured to perform detailed risk assessments in view of the borrower-related information for automatically underwriting one or more potential loans per borrower for at least discussion with the representative of the lender.

6. The digital mortgage application system of claim 1, wherein the digital mortgage application stack further includes an e-mail server, the lender GUI further configured to allow the representative of the lender to send secured e-mail messages through the lender GUI by way of the e-mail server with automatic e-mail headers and attachments determined in accordance with a focus in the lender GUI on a particular borrower and loan process step.

7. A digital mortgage application system comprising:
   a borrower web application configured to run at least in part from a primary memory of a personal computer and present a borrower graphical user interface ('GUI') within a web browser on a display of the personal computer, the borrower GUI including a digital mortgage application divided into a plurality of borrower-fillable sections selected from a borrower profile section, a subject property section, an employment history section, and an income-and-asset information section, each of which sections is configured to hold borrower-related information, and some of which sections are configured with one or more user-operable graphical elements configured to commence one or more automated information-filling processes;

a lender web application configured to run at least in part from a primary memory of a personal computer and present a lender GUI within a web browser on a display of the personal computer, the lender GUI configured to allow a representative of the lender to review borrower information in one or more digital mortgage applications of one or more borrowers and send secured e-mail messages with automatic e-mail headers and attachments determined in accordance with a focus in the lender GUI on a particular borrower and loan process step;

a digital mortgage application stack configured to run at least in part from a primary memory of at least one server host, the digital mortgage application stack including a web server, a digital mortgage application server, a database server, and an e-mail server, of which at least the web server, the digital mortgage application server, and the database servers are configured to execute the one or more automated information-filling processes upon activation of the one or more graphical elements in the borrower GUI;

a data enrichment logic configured to extract data and utilize an optical character recognition ("OCR") module to recognize text in borrowers' digital photograph files or other image-based files, extract the text from the digital photograph files or the other image-based files, and provide the text for automated information-filling processes;

a personal loan dashboard comprising one or more of registration pages; information and documentation verifications, and wherein a Certified Lender Program ("CLP") agent portal is coupled to a proprietary loan origination system, the dashboard further comprising interactive loan scenario generation tools configured to allow lenders to customize loan offers in real-time and determine borrower eligibility changes dynamically;

an automated underwriting module configured to perform one or more detailed risk assessments in view of borrower-related information for automatically underwriting one or more potential loans per borrower, wherein subsequent to performing a detailed risk assessment, the lender GUI includes a document viewer configured for viewing findings from the automated underwriting module; and wherein a subject property section of the plurality of sections is configured with a graphical button configured to send a unique identifier for a real estate property to the digital mortgage application stack upon activation of the graphical button for fetching listing information for the real estate property from one or more multiple listings service databases for the automated information-filling process.

8. The digital mortgage application system of claim 7, wherein the digital mortgage application server includes an automated underwriting module configured to perform detailed risk assessments in view of the borrower-related information for automatically underwriting one or more potential loans per borrower for at least discussion with the representative of the lender.

9. A non-transitory computer-readable medium ("CRM") including executable instructions that, when executed on a server host by one or more processors, cause the server host to instantiate at least a portion of a digital mortgage application system configured to perform a plurality of steps, comprising:

running a digital mortgage application stack at least in part from a primary memory of the server host, the digital mortgage application stack including a web server, a digital mortgage application server, and a database server configured to service requests from one or more client hosts;

servicing at least a first request for a borrower web application from a first client host, the borrower web application configured to run at least in part from a primary memory of a personal computer configured as the first client host and present a borrower graphical user interface ("GUI") within a web browser on a display of the personal computer, the borrower GUI including a digital mortgage application divided into a plurality of borrower-fillable sections configured to hold borrower-related information, some of which sections are configured for optionally automatically filling in one or more portions of the borrower-related information;

performing, by the server, a data enrichment process including verifying extracted data and utilizing an optical character recognition ("OCR") module to recognize text in borrowers' digital photograph files or other image-based files, extract the text from the digital photograph files or the other image-based files, and provide the text for automated information-filling processes;

providing a dashboard comprising interactive loan scenario generation tools configured to allow lenders to customize loan offers in real-time and determine borrower eligibility changes dynamically; and servicing at least a second request for a lender web application from a second client host, the lender web application configured to run at least in part from a primary memory of a personal computer configured as the second client host and present a lender GUI within a web browser on a display of the personal computer, the lender GUI configured to allow a representative of the lender to review information in one or more digital mortgage applications of one or more borrowers; and wherein a subject property section of the plurality of sections is configured with a graphical button configured to send a unique identifier for a real estate property to the digital mortgage application stack upon activation of the graphical button for fetching listing information for the real estate property from one or more multiple listings service databases for the automated information-filling process.

10. The CRM of claim 9, the plurality of steps further comprising receiving by the digital mortgage application stack a digital photograph file from the first client host subsequent to activation of at least a first graphical button in a borrower profile section of the plurality of sections configured to take a digital photograph of an item of borrower identification for sending the digital photograph file to the digital mortgage application stack for the automated information-filling process.

11. The CRM of claim 10, the plurality of steps further comprising: recognizing text and extracting the text from the digital photograph file with an optical character recognition ("OCR") module of the digital mortgage application server, and sending the text by way of the web server to the first client host for the automated information-filling processes.

12. The CRM of claim 9, the plurality of steps further comprising: fetching listing information for a real estate property from one or more multiple listings service databases upon receipt of a unique identifier for the real estate property from the first client host subsequent to activation of a graphical button in a subject property section of the plurality of sections configured to send the unique identifier for the real estate property to the digital mortgage application stack for the automated information-filling process; and sending the listing information for the real estate property by way of the web server to the first client host for the automated information-filling process.

13. The CRM of claim 9, the plurality of steps further comprising: fetching employment history information for the borrower from one or more employers, one or more third-party employment verification providers, or a combination thereof upon receipt of one or more borrower identifiers from the first client host subsequent to activation of a graphical button in an employment history section of the plurality of sections configured to send one or more borrower identifiers to the digital mortgage application stack for the automated information-filling process; and sending the employment history information for the borrower by way of the web server to the first client host for the automated information-filling process.

14. The CRM of claim 9, the plurality of steps further comprising: receiving one or more financial account identifiers from the first client host subsequent to activation of a first graphical button in an income-and-asset information section of the plurality of sections configured to send the one or more financial account identifiers to the digital mortgage application stack for the automated information-filling process; receiving financial account authorization information from the first client host subsequent to activation of a second graphical button in the income-and-asset information section of the plurality of sections configured to send the financial account authorization information to the digital mortgage application stack for the automated information-filling process; and linking one or more financial accounts for the automated information-filling process.

15. The CRM of claim 9, the plurality of steps further comprising performing a detailed risk assessment with an automated underwriting module of the digital mortgage application server in view of the borrower-related information for at least discussion of one or more potential loans per borrower with the representative of the lender.

16. The CRM of claim 9, the plurality of steps further comprising sending one or more secured e-mail messages by way of an e-mail server of the digital mortgage application stack upon request by the representative of the lender through the lender GUI, wherein e-mail headers and attachments are automatically determined in accordance with a focus in the lender GUI on a particular borrower and loan process step.

\* \* \* \* \*